(12) United States Patent
Yang et al.

(10) Patent No.: US 12,356,496 B2
(45) Date of Patent: Jul. 8, 2025

(54) CONNECTED MODE DISCONTINUOUS RECEPTION (C-DRX) ON/OFF SYNCHRONIZATION COORDINATION BETWEEN USER EQUIPMENT AND NETWORK

(71) Applicant: QUALCOMM Incorporated, San Diego, CA (US)

(72) Inventors: Ming Yang, San Diego, CA (US); Kausik Ray Chaudhuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 18/045,428

(22) Filed: Oct. 10, 2022

(65) Prior Publication Data
US 2024/0121856 A1 Apr. 11, 2024

(51) Int. Cl.
*H04W 76/28* (2018.01)
(52) U.S. Cl.
CPC .................. *H04W 76/28* (2018.02)
(58) Field of Classification Search
CPC ..................................... H04W 76/28
See application file for complete search history.

(56) References Cited

U.S. PATENT DOCUMENTS

| 2013/0201892 A1* | 8/2013 | Holma | H04W 76/28 370/311 |
|---|---|---|---|
| 2022/0132277 A1* | 4/2022 | Shrivastava | H04W 76/28 |

\* cited by examiner

*Primary Examiner* — Ayanah S George
(74) *Attorney, Agent, or Firm* — ArentFox Schiff LLP

(57) ABSTRACT

Apparatus, methods, and computer-readable media for connected mode discontinuous reception (C-DRX) on/off synchronization coordination between user equipment and network are disclosed herein. A user equipment (UE) may transmit a UE capability message that indicates that the UE has capability to support C-DRX on/off synchronization coordination with the network entity. The UE may receive a DRX synchronization coordination configuration based on the UE capability message, the DRX synchronization coordination configuration configuring the UE with the C-DRX on/off synchronization coordination with the network entity. The UE may determine that an inactivity timer associated with the DRX synchronization coordination configuration is within a threshold time to expire, and transmit special uplink signaling indicating that the UE intends to transition into an off duration in a DRX cycle based on the inactivity timer being within the threshold time to expire.

30 Claims, 12 Drawing Sheets

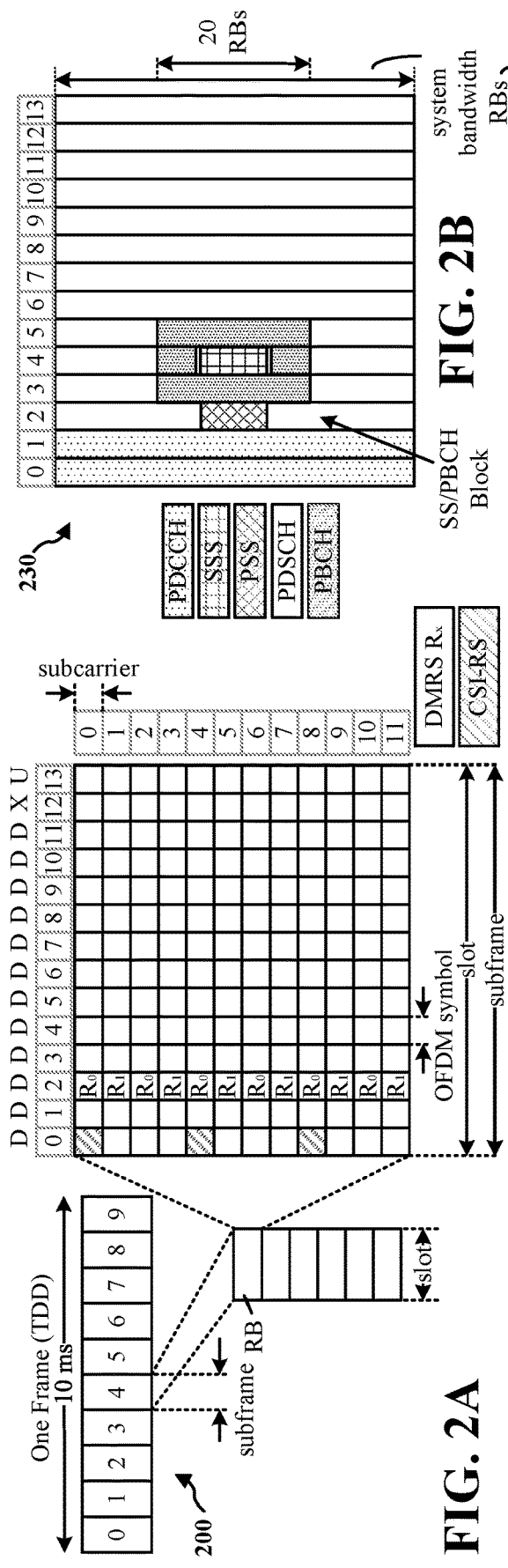
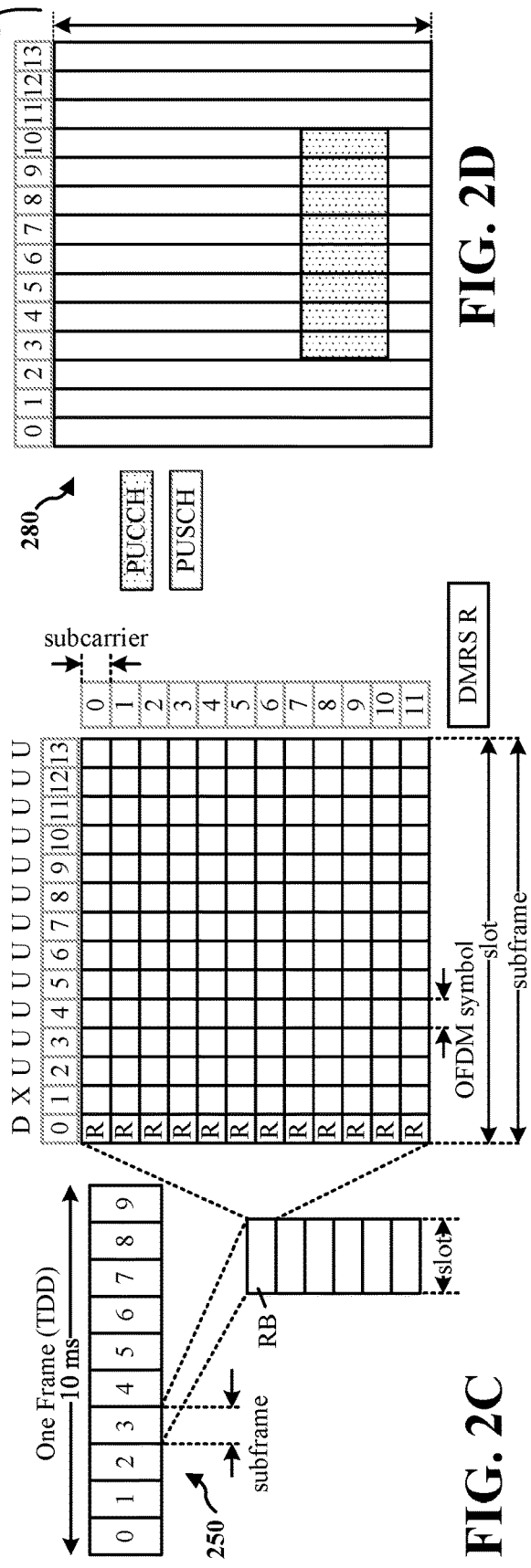
FIG. 2A  FIG. 2B  FIG. 2C  FIG. 2D

CONNECTED MODE DISCONTINUOUS RECEPTION (C-DRX) ON/OFF SYNCHRONIZATION COORDINATION BETWEEN USER EQUIPMENT AND NETWORK

BACKGROUND

Technical Field

The present disclosure relates generally to communication systems, and more particularly, to connected mode discontinuous reception (C-DRX) on/off synchronization coordination between user equipment and network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects and features related to power saving in wireless communication systems are described. Some aspects described herein allow supporting multiple power and/or spectrum efficient modes/configurations in wireless communication devices, e.g., such as IoT devices, to facilitate low power operations and/or reduce power consumption.

In an aspect of the disclosure, a method is provided for wireless communication performed by a user equipment (UE). The example method includes transmitting, to a network entity, a UE capability message that indicates that the UE has capability to support connected mode discontinuous reception (C-DRX) on/off synchronization coordination with the network entity; receiving, from the network entity, a DRX synchronization coordination configuration based on the UE capability message, the DRX synchronization coordination configuration configuring the UE with the C-DRX on/off synchronization coordination with the network entity; determining that an inactivity timer associated with the DRX synchronization coordination configuration is within a threshold time to expire; and transmitting, to the network entity, uplink signaling indicating that the UE intends to transition into an off duration in a DRX cycle based on the inactivity timer being within the threshold time to expire.

In another aspect of the disclosure, a system is provided for wireless communication at a UE. An example system includes a memory and at least one processor coupled to the memory and configured to transmit, to a network entity, a UE capability message that indicates that the UE has capability to support C-DRX on/off synchronization coordination with the network entity; receive, from the network entity, a DRX synchronization coordination configuration based on the UE capability message, the DRX synchronization coordination configuration configuring the UE with the C-DRX on/off synchronization coordination with the network entity; determine that an inactivity timer associated with the DRX synchronization coordination configuration is within a threshold time to expire; and transmit, to the network entity, uplink signaling indicating that the UE intends to transition into an off duration in a DRX cycle based on the inactivity timer being within the threshold time to expire.

In another aspect of the disclosure, a computer-readable medium storing computer-executable code is provided for wireless communication at a UE. The code when executed by at least one processor, cause the at least one processor to transmit, to a network entity, a UE capability message that indicates that the UE has capability to support C-DRX on/off synchronization coordination with the network entity; receive, from the network entity, a DRX synchronization coordination configuration based on the UE capability message, the DRX synchronization coordination configuration configuring the UE with the C-DRX on/off synchronization coordination with the network entity; determine that an inactivity timer associated with the DRX synchronization coordination configuration is within a threshold time to expire; and transmit, to the network entity, uplink signaling indicating that the UE intends to transition into an off duration in a DRX cycle based on the inactivity timer being within the threshold time to expire.

In another aspect of the disclosure, an apparatus is provided for wireless communication at a UE. An example apparatus includes means for transmitting, to a network entity, a UE capability message that indicates that the UE has capability to support C-DRX on/off synchronization coordination with the network entity; means for receiving, from the network entity, a DRX synchronization coordination configuration based on the UE capability message, the DRX synchronization coordination configuration configuring the UE with the C-DRX on/off synchronization coordination with the network entity; means for determining that an inactivity timer associated with the DRX synchronization coordination configuration is within a threshold time to expire; and means for transmitting, to the network entity, uplink signaling indicating that the UE intends to transition into an off duration in a DRX cycle based on the inactivity timer being within the threshold time to expire.

In another aspect of the disclosure, a method is provided for wireless communication performed by a network entity. The example method includes receiving, from a UE, a UE capability message that indicates that the UE has capability to support C-DRX on/off synchronization coordination with the network entity; transmitting, to the UE, a DRX synchronization coordination configuration based on the UE capability message, the DRX synchronization coordination configuration configuring the UE with the C-DRX on/off synchronization coordination with the network entity; receiving, from the UE, uplink signaling indicating that the UE intends to transition into an off duration in a DRX cycle based on a first inactivity timer of the UE being within a threshold time to expire; and transmitting, to the UE, a C-DRX command that causes the UE to transition into the off duration of the DRX cycle prior to expiration of the first inactivity timer.

In another aspect of the disclosure, a system is provided for wireless communication at a network entity. An example system includes a memory and at least one processor coupled to the memory and configured to receive, from a UE, a UE capability message that indicates that the UE has capability to support C-DRX on/off synchronization coordination with the network entity; transmit, to the UE, a DRX synchronization coordination configuration based on the UE capability message, the DRX synchronization coordination configuration configuring the UE with the C-DRX on/off synchronization coordination with the network entity; receive, from the UE, uplink signaling indicating that the UE intends to transition into an off duration in a DRX cycle based on a first inactivity timer of the UE being within a threshold time to expire; and transmit, to the UE, a C-DRX command that causes the UE to transition into the off duration of the DRX cycle prior to expiration of the first inactivity timer.

In another aspect of the disclosure, a computer-readable medium storing computer-executable code is provided for wireless communication at a network entity. The code when executed by at least one processor, cause the at least one processor to receive, from a UE, a UE capability message that indicates that the UE has capability to support C-DRX on/off synchronization coordination with the network entity; transmit, to the UE, a DRX synchronization coordination configuration based on the UE capability message, the DRX synchronization coordination configuration configuring the UE with the C-DRX on/off synchronization coordination with the network entity; receive, from the UE, uplink signaling indicating that the UE intends to transition into an off duration in a DRX cycle based on a first inactivity timer of the UE being within a threshold time to expire; and transmit, to the UE, a C-DRX command that causes the UE to transition into the off duration of the DRX cycle prior to expiration of the first inactivity timer.

In another aspect of the disclosure, an apparatus is provided for wireless communication at a network entity. An example apparatus includes means for receiving, from a UE, a UE capability message that indicates that the UE has capability to support C-DRX on/off synchronization coordination with the network entity; means for transmitting, to the UE, a DRX synchronization coordination configuration based on the UE capability message, the DRX synchronization coordination configuration configuring the UE with the C-DRX on/off synchronization coordination with the network entity; means for receiving, from the UE, uplink signaling indicating that the UE intends to transition into an off duration in a DRX cycle based on a first inactivity timer of the UE being within a threshold time to expire; and means for transmitting, to the UE, a C-DRX command that causes the UE to transition into the off duration of the DRX cycle prior to expiration of the first inactivity timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
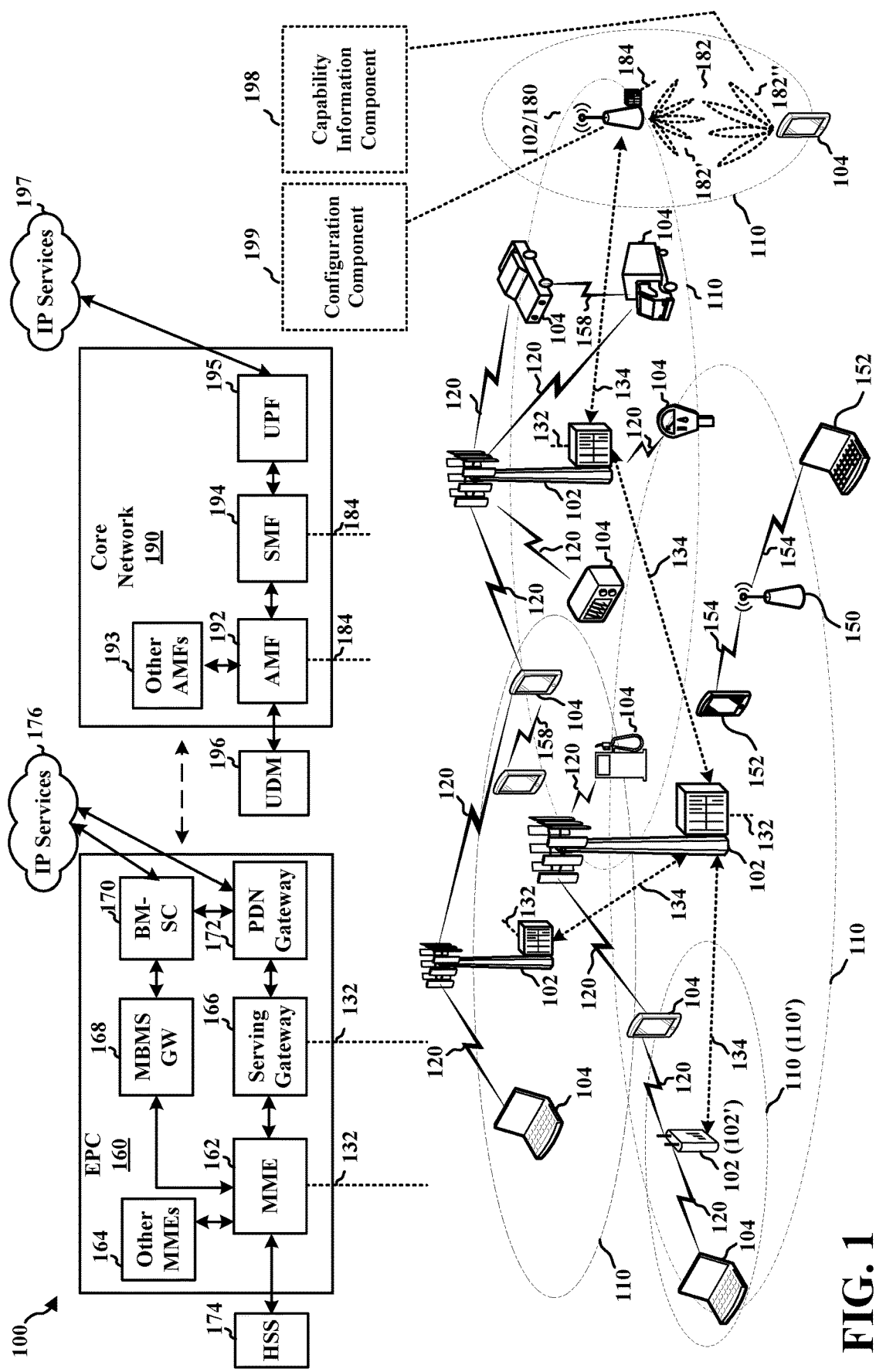
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The base station and UE use their own C-DRX inactivity timers. For example, the base station can determine whether a UE is in the active state (or operating in the on duration) or in the sleep state (or operating in the off duration) based on a local inactivity timer maintained by the base station. When the base station mistakenly detects scheduling request (SR) signaling from a UE that should be in the sleep state (or off duration of the DRX cycle), or conversely, the UE, operating in the on duration of the DRX cycle, fails to detect downlink signaling (e.g., physical downlink control channel (PDCCH) downlink control information (DCI)) from the network entity, the DRX inactivity timers between the base station and UE are operating inconsistently (and thereby out of synchronization). As a result, the base station may mistakenly conclude that the UE is operating in the on duration of the DRX cycle when in fact the UE is operating in the off duration of the DRX cycle. The adverse effects of this out-of-synchronization between the base station and UE may cause the following: 1) the UE may not respond to the scheduling from the base station as the UE may be in the sleep state instead of the active state as mistakenly identified by the base station, which increases the block error rate (BLER) and the number of used PDCCH control channel elements (CCEs), among others; and 2) the UE-based measurement results (e.g., SRS and CSI-RS feedback) may be inaccurate. Some legacy approaches may already support PDCCH misdetection by way of discontinuous transmission (DTX) detection techniques, adaptive and dynamically PDCCH aggregation level adjustments, ACK/NACK carried in PUCCH reliability enhancement techniques, among others. However, challenges still persist to quickly detect and handle C-DRX state mismatch between the UE and the network, especially in weak RF environments, thus resulting in undesirable user experience and degraded network key performance indicators.

The subject technology provides for facilitating C-DRX on/off synchronization coordination between user equipment and network. In some implementations, a UE for facilitating C-DRX on/off synchronization coordination with the network can a transmit UE capability message that indicates that the UE has capability to support C-DRX on/off synchronization coordination with the network entity. The UE can receive a C-DRX configuration based on the UE capability message, the DRX synchronization coordination configuration configuring the UE with the C-DRX on/off synchronization coordination with the network entity. The UE can determining that an inactivity timer associated with the DRX synchronization coordination configuration is within a threshold time to expire, and transmits uplink signaling indicating that the UE intends to transition into an off duration in a DRX cycle based on the inactivity timer being within the threshold time to expire. By transmitting the indication that the UE intends to transition into the off duration of the DRX cycle based on its local inactivity timer being within the threshold time to expire, the network entity can synchronize its local inactivity timer with that of the UE, such that both the UE and BS can coordinate the synchronization between their respective on/off C-DRX states.

Accordingly, this allows the base station and UE to keep their C-DRX on/off state synchronized with one another to avoid performance loss due to a mismatch in a weak RF environment, resulting in battery and energy savings for both the UE and network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a capability information component 198, which is configured to transmit, to a network entity, a UE capability message that indicates that the UE has capability to support connected mode discontinuous reception (C-DRX) on/off synchronization coordination with the network entity. The capability information component 198 is also configured to receive, from the network entity, a DRX synchronization coordination configuration based on the UE capability message, the DRX synchronization coordination configuration configuring the UE with the C-DRX on/off synchronization coordination with the network entity. The capability information component 198 is also configured to determine that an inactivity timer associated with the DRX synchronization coordination configuration is within a threshold time to expire. The capability information component 198 is also configured to transmit, to the network entity, uplink signaling indicating that the UE intends to transition into an off duration in a DRX cycle based on the inactivity timer being within the threshold time to expire. Furthermore, in certain aspects, the base station 102/180 may include a configuration component 199, which is configured to receive, from a user equipment (UE), a UE capability message that indicates that the UE has capability to support connected mode discontinuous reception (C-DRX) on/off synchronization coordination with the network entity. The configuration component 199 is also configured to transmit, to the UE, a DRX synchronization coordination configuration based on the UE capability message, the DRX synchronization coordination configuration configuring the UE with the C-DRX on/off synchronization coordination with the network entity. The configuration component 199 is also configured to receive, from the UE, uplink signaling indicating that the UE intends to transition into an off duration in a DRX cycle based on a first inactivity timer of the UE being within a threshold time to expire. The configuration component 199 is also configured to transmit, to the UE, a C-DRX command that causes the UE to transition into the off duration of the DRX cycle prior to expiration of the first inactivity timer. Further related aspects and features are described in more detail in connection with FIGS. 5-11. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
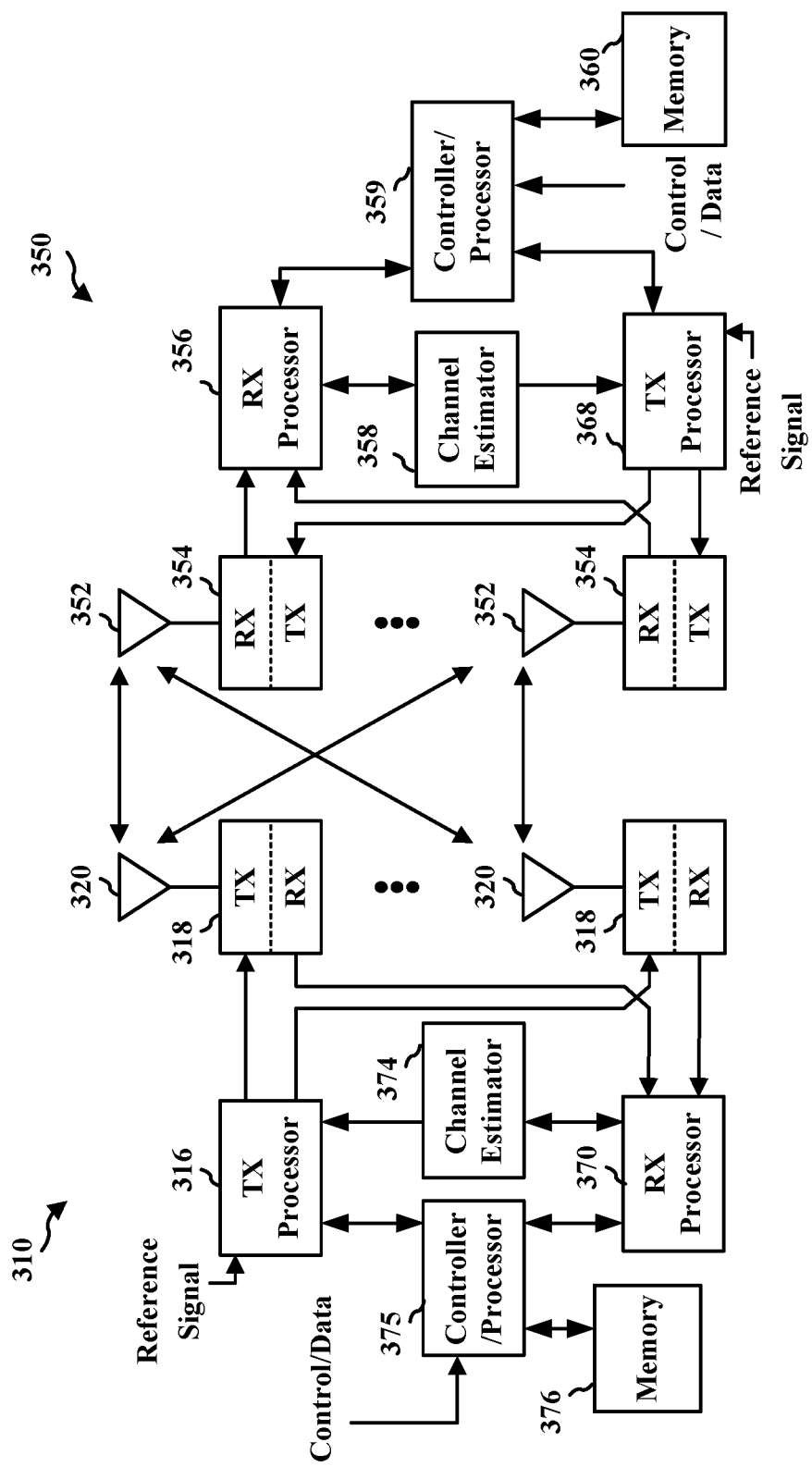
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with capability information component 198 of FIG. 1.

At least one of the TX processor 316, the RX processor 370, and the controller/processor 375 may be configured to perform aspects in connection with configuration component 199 of FIG. 1.

Figure 4:
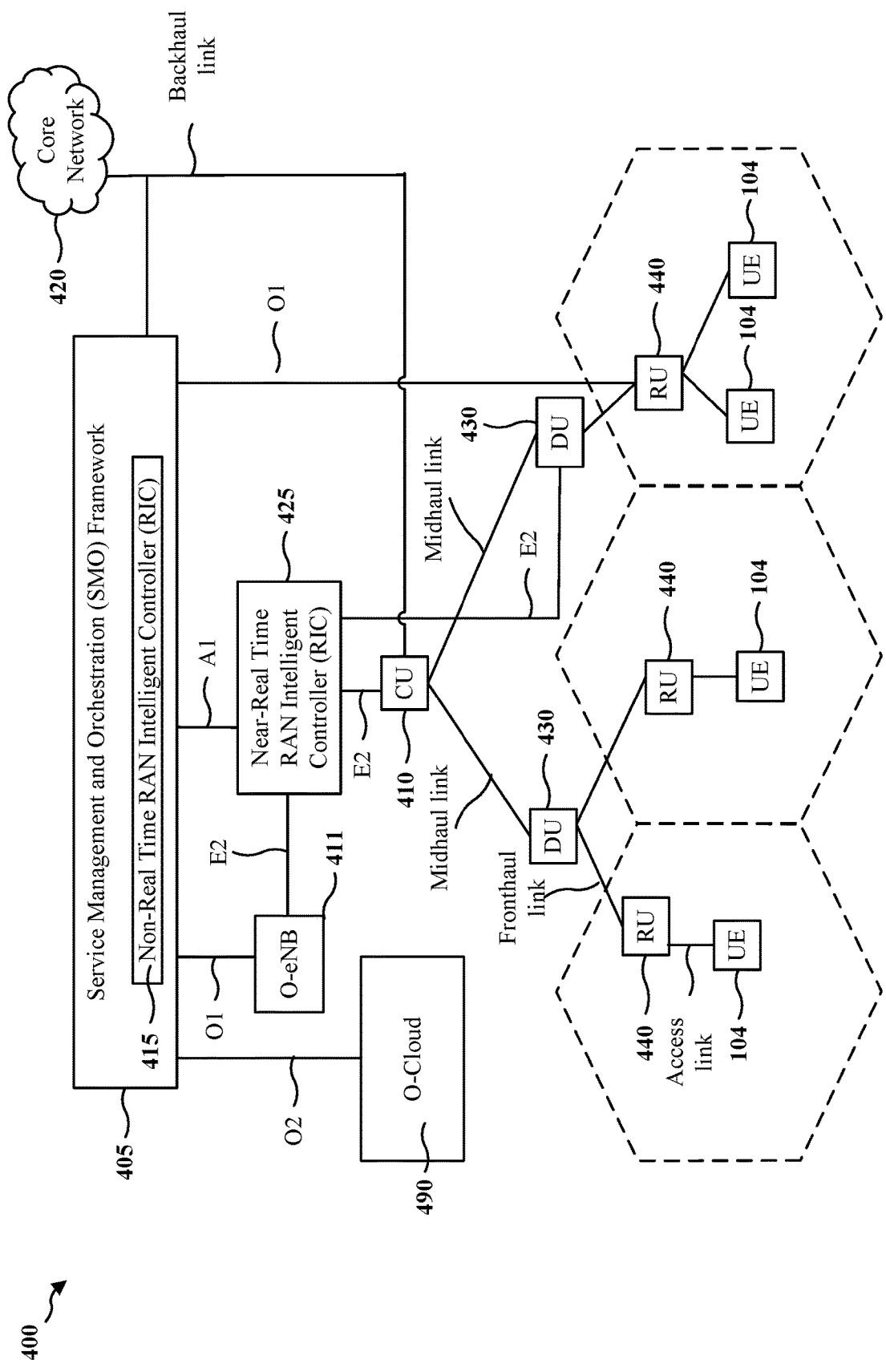
FIG. 4 is a block diagram illustrating an example disaggregated base station architecture in accordance with various aspects of the present disclosure.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

A UE may be configured by a base station for a DRX mode. When there is no data to be transmitted between the UE and base station in either direction, e.g., no uplink or downlink transmissions, the UE may enter the DRX mode in which the UE may monitor a control channel discontinuously using a sleep and wake cycle. DRX conserves battery power at the UE for improved power efficiency. Without DRX, the UE may monitor the control channel in every slot/subframe to check whether there is data for the UE. Continuous monitoring of the control channel places a demand on the UE's battery power.

The DRX configuration may be configured by the network in RRC signaling from a base station, e.g. in an RRC Connection Setup request or an RRC connection reconfiguration request. A DRX configuration may include the configuration of any of a number of timers and values, e.g., any of an On-duration Timer, a DRX Inactivity Timer, a DRX DL Retransmission Timer, a DRX UL Retransmission Timer, a DRX Long Cycle, a value of the DRX Start Offset, a DRX Short Cycle Timer, and/or a DRX Short Cycle, etc. A DRX Cycle may comprise a periodic repetition of On-duration in which the UE monitors PDCCH and an OFF Duration, which may be referred to as a DRX opportunity. During the OFF duration, the UE does not monitor for PDCCH. The UE may enter a sleep mode or low power mode in which the UE minimizes power consumption by shutting down a radio frequency (RF) function without detecting communication from the base station.

As an example, a DRX Inactivity Timer may indicate a time, e.g., in terms of TTI duration, after the UE successfully decodes PDCCH when the UE may again enter the OFF Duration. An On-duration Timer may indicate an amount of time during which the UE monitors for communication from the base station when the UE wakes up from the OFF duration in DRX Cycle. For example, the On-duration Timer may give the number of consecutive PDCCH subframe(s) be monitored/decoded when the UE wakes up from the OFF duration in DRX Cycle. The UE may be considered to be in a DRX active time if at least one associated timer is running (e.g., the DRX On-duration Timer, the DRX Inactivity Timer, and/or the DRX Retransmission Timer) and the UE is monitoring for communication from the base station.

In one approach to DRX configuration, the UE may transmit UE capability parameters to the network (e.g., RAN/5GC) during a RRC connected mode (or RRC connected state). This UE capability declaration may be useful to the network to schedule radio resources and provide 5G NR services to the UE. The UE preferred C-DRX cycle may be declared via a DRX preference information element (IE). After the network acquires the UE capability information, the network may assign this preferred configuration as the UE default C-DRX cycle.

Figure 5:
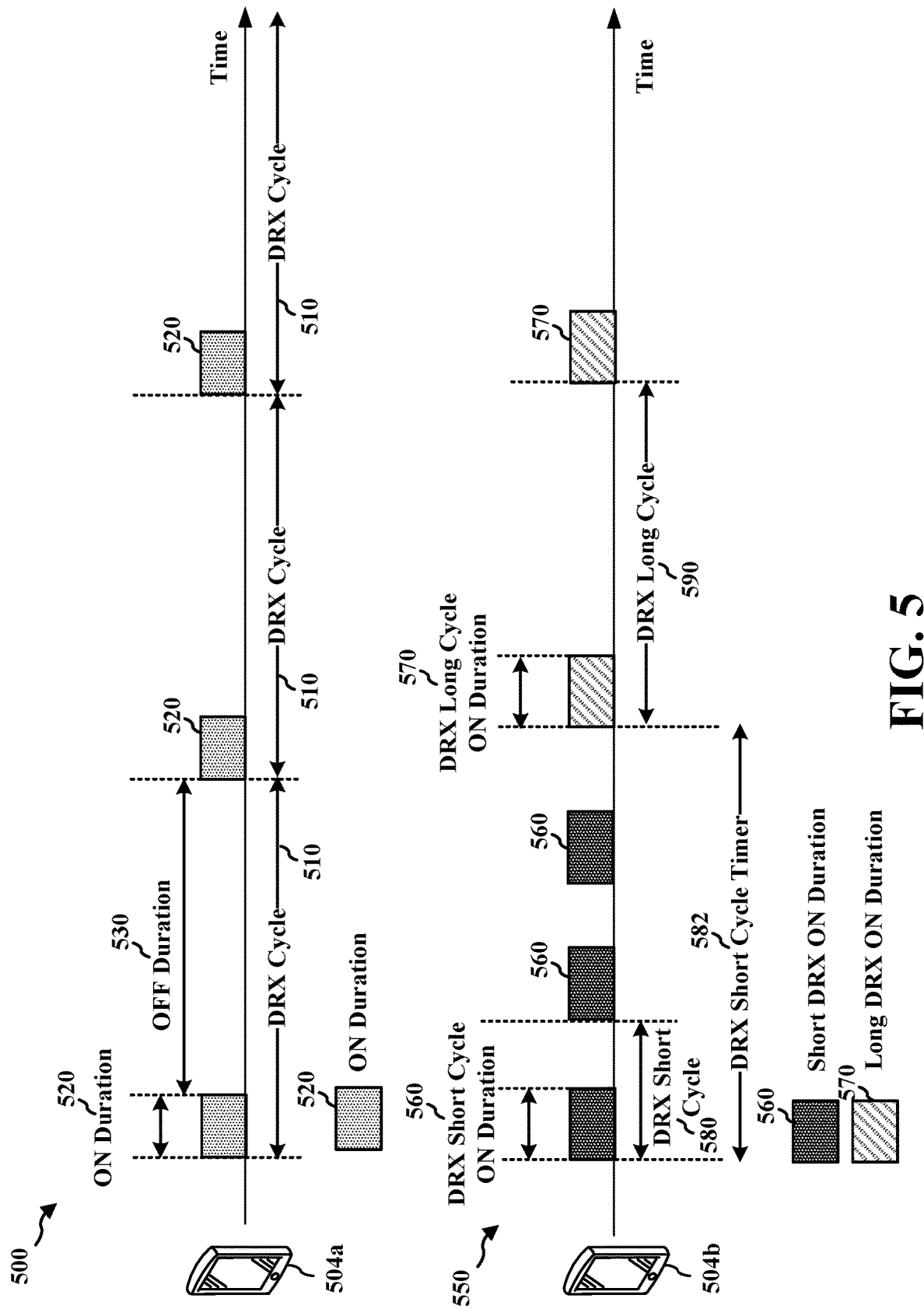
FIG. 5 illustrates example discontinuous reception (DRX) cycles.

FIG. 5 illustrates example DRX timelines 500, 550. In DRX timeline 500, a UE 504a may be configured by a base station (e.g., 102/180) for DRX. During an RRC connected state, when there is no data transmission in either direction (e.g., UL/DL), the UE 504a may operate using the DRX mode. In the DRX mode, the UE 504a monitors a PDCCH channel discontinuously using a "sleep" and "wake" cycle. When the UE 504a is in an RRC connected state or an RRC connected mode, the DRX may also be referred to as Connected Mode DRX (C-DRX). DRX conserves battery power at the UE 504a. In a non-DRX mode, the UE 504a monitors for PDCCH in each subframe to check whether there is downlink data available. Continuous monitoring of the PDCCH drains a battery power of the UE 504a.

The DRX configuration of the UE 504a may be configured by the network using RRC signaling from the base station 102/180, such as in an RRC Connection Setup request or an RRC connection reconfiguration request. A DRX configuration may include the configuration of one or more timers and values. In some examples, the DRX configuration may include any of an On-Duration Timer, a DRX Inactivity Timer, a DRX Retransmission Timer, a DRX UL Retransmission Timer, a DRX Long Cycle 590, a value of the DRX Start Offset, a DRX Short Cycle Timer 582, and/or a DRX Short Cycle 580, among others. As illustrated in DRX timeline 500, a DRX cycle 510 may comprise a periodic repetition of an on duration in which the UE 504a monitors for PDCCH from the base station 102/180 and an off duration 530.

The DRX cycle 510 may include periodic on durations 520 during which the UE monitors for PDCCH and off durations 530 during which the UE may not monitor for the PDCCH. The off duration 530 may be referred to as a DRX opportunity. During the off duration 530, the UE 504a does not monitor for PDCCH. The UE 504a may enter a sleep mode or a low power mode in which the UE 504a decreases power consumption by shutting down a RF function without detecting communication from the base station 102/180.

The On-duration Timer may correspond to a number of consecutive PDCCH subframes to be monitored or decoded when the UE 504a wakes up from the off duration 530 in the DRX Cycle 510. The DRX Retransmission Timer may correspond to a consecutive number of PDCCH subframes for the UE 504a to monitor when a retransmission is expected by the UE 504a. The DRX Inactivity Timer may correspond to an amount of time before the UE 504a may again enter the off duration 530 following successfully decoding PDCCH. The amount of time may be in terms of a TTI duration. After the UE 504a successfully receives downlink data, the DRX Inactivity Timer may start counting a number of subframes. If any uplink or downlink data transmissions occur while the DRX Inactivity Timer is running, the timer restarts. If the DRX Inactivity Timer expires without uplink or downlink activity, the UE 504a may enter the DRX cycle 510 to achieve power savings.

The example DRX timeline 550 illustrates an example DRX short cycle 580. For example, a UE 504b may start with a DRX short cycle 580. The DRX short cycle 580 may correspond to a first DRX cycle that the UE 504b enters after successful expiration of DRX Inactivity Timer. The DRX short cycle 580 may include periodic on durations 560 during which the UE 504b monitors for PDCCH. The UE 504b may operate using the DRX short cycle 580 until a DRX Short Cycle Timer 582 expires. The DRX Short Cycle Timer 582 may correspond to a number of consecutive subframes during which the UE 504b follows the DRX short cycle 580 after the DRX Inactivity Timer has expired. The example DRX timeline 550 also illustrates an example DRX long cycle 590. For example, once the DRX short cycle 580 expires, the UE 504b may enter a DRX long cycle 590. The DRX long cycle 590 may include periodic on durations 570 during which the UE 504b monitors for PDCCH. The UE 504b may further be able to transition to an idle DRX mode based on an RRC Inactivity Timer.

Some NR communication systems may support scalable much wider channel BW (CBW) compared to LTE, which relates to data rate, latency, bandwidth, and/or spectrum bands that can be supported. The wide CBW may allow more efficient use of resources than the existing carrier aggregation (CA) schemes. Furthermore, NR provides a mechanism to adjust a UE's operating BW based on the bandwidth part (BWP) concept. With BWP, a UE may not be required to transmit or receive outside of a configured frequency range of an active BWP (except for measurement gaps). The BWP concept allows improvement in power efficiency and/or reduction in power consumption thereby facilitating low power operations.

In accordance with the proposed processes described herein, aspects of power saving may be incorporated in the UE capability signaling such as C-DRX configuration. The concept of C-DRX configuration may be understood with an example of a receiver in a low power mode that may wake up just in time for the data to be received during a particular C-DRX cycle length, while remaining asleep at other times to conserve power. Such a concept may be very useful in low power devices, for example, devices intended for IoT and/or enhanced machine type communication (eMTC) applications that may infrequently transmit and receive small amounts of data (e.g., a few times in a given time period).

The base station and UE use their own C-DRX inactivity timers. For example, the base station can determine whether a UE is in the active state (or operating in the on duration) or in the sleep state (or operating in the off duration) based on a local inactivity timer maintained by the base station. When the base station mistakenly detects scheduling request (SR) signaling from a UE that should be in the sleep state (or off duration of the DRX cycle), or conversely, the UE, operating in the on duration of the DRX cycle, fails to detect downlink signaling (e.g., PDCCH DCI) from the network entity, the DRX inactivity timers between the base station and UE are operating inconsistently (and thereby out of synchronization). As a result, the base station may mistakenly conclude that the UE is operating in the on duration of the DRX cycle when in fact the UE is operating in the off duration of the DRX cycle. The adverse effects of this out-of-synchronization between the base station and UE may cause the following: 1) the UE may not respond to the scheduling from the base station as the UE may be in the sleep state instead of the active state as mistakenly identified by the base station, which increases the block error rate (BLER) and the number of used PDCCH CCEs, among others; and 2) the UE-based measurement results (e.g., SRS and CSI-RS feedback) may be inaccurate. Some legacy approaches may already support PDCCH misdetection by way of discontinuous transmission (DTX) detection techniques, adaptive and dynamically PDCCH aggregation level adjustments, ACK/NACK carried in PUCCH reliability enhancement techniques, among others.

In some legacy approaches that attempt to address the issue of the DRX inactivity timer status mismatch between a UE and network that may not be resolved by the DTX detection is the exit from DRX operation for UEs in weak-coverage environments including voice-over-new-radio (VoNR) operation to help prevent negative voice quality performance. For example, if a UE initially accesses a cell and meets any low signal strength quality conditions (e.g., Msg3-based DMRS RSRP is smaller than the value sum of InitDmrsRsrpWeakCovThld and WeakCoverageThldOffset and/or Msg3-based DMRS SINR is smaller than the value sum of InitDmrsSinrWeakCovThld and WeakCoverageThldOffset), the UE may be identified as a weak-coverage UE. In this case, C-DRX parameters may not be configured in a RRC reconfiguration message. In another example, if DRX parameters are initially configured for a UE through RRC signaling and meets any low signal strength quality conditions (e.g., CQI measurement result periodically reported by a UE is smaller than the value of WeakCoverageCqiThld and/or uplink SINR is smaller than the value of WeakCoverageUlSinrThld), the UE may be identified as a weak-coverage UE and reconfigured to exit the DRX mode through a RRC reconfiguration message. For example, a base station may first configure C-DRX mode for a data-based call that meets a specified RF condition; however, the base station may then release the C-DRX mode when a voice call is established to ensure the voice quality is not impacted by a possible C-DRX on/off state mismatch between the UE and network. Afterwards, the base station may then configure the C-DRX mode once the voice call is terminated. However, challenges still persist to quickly detect and handle C-DRX state mismatch between the UE and the network, especially in weak RF environments, thus resulting in undesirable user experience and degraded network key performance indicators.

The subject technology provides for facilitating C-DRX on/off synchronization coordination between user equipment and network. In some implementations, a UE for facilitating C-DRX on/off synchronization coordination with the network can a transmit UE capability message that indicates that the UE has capability to support C-DRX on/off synchronization coordination with the network entity. The UE can receive a C-DRX configuration based on the UE capability message, the DRX synchronization coordination configuration configuring the UE with the C-DRX on/off synchronization coordination with the network entity. The UE can determining that an inactivity timer associated with the DRX synchronization coordination configuration is within a threshold time to expire, and transmits uplink signaling indicating that the UE intends to transition into an off duration in a DRX cycle based on the inactivity timer being within the threshold time to expire. By transmitting the indication that the UE intends to transition into the off duration of the DRX cycle based on its local inactivity timer being within the threshold time to expire, the network entity can synchronize its local inactivity timer with that of the UE, such that both the UE and BS can coordinate the synchronization between their respective on/off C-DRX states. Accordingly, this allows the base station and UE to keep their C-DRX on/off state synchronized with one another to avoid performance loss due to a mismatch in a weak RF environment, resulting in battery and energy savings for both the UE and network.

Figure 6:
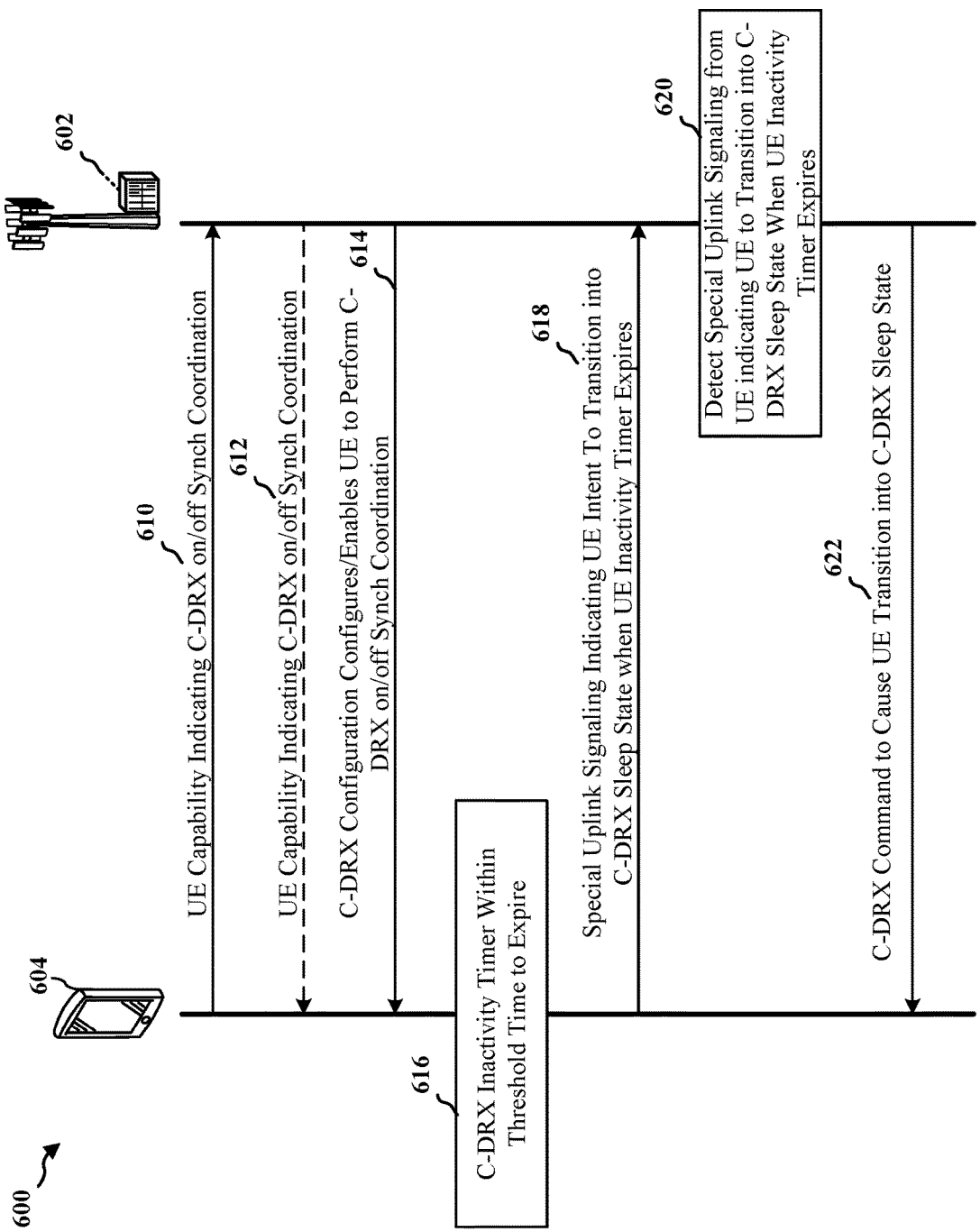
FIG. 6 is a diagram illustrating a call flow between a UE and a base station for C-DRX on/off synchronization coordination between user equipment and network in accordance with some aspects of the present disclosure.

FIG. 6 is a diagram illustrating a call flow 600 between a UE 604 and a base station 602 for C-DRX on/off synchronization coordination between the UE 604 and network in accordance with some aspects of the present disclosure. The base station 602 may be similar to the base station 102/180 and the device 310. The UE 604 may be similar to the UE 104 and the device 350.

At 610, the UE 604 may transmit, to a network entity (e.g., the BS 602), a UE capability message that indicates that the UE 604 has capability to support C-DRX on/off synchronization coordination with the BS 602. In turn, BS 602 receives the UE capability message that indicates that the UE has capability to support C-DRX on/off synchronization coordination with the network entity.

At 612, the BS 602 may transmit, to the UE 604, a response message indicating that the network entity confirms acknowledgment that the UE 604 has the capability to support the C-DRX on/off synchronization coordination with the BS 602. In turn, the UE 604 receives, from the BS 602, the response message indicating that the network entity confirms acknowledgment that the UE 604 has the capability to support the C-DRX on/off synchronization coordination with the network entity.

At 614, the BS 602 may transmit, to the UE 604, a DRX synchronization coordination configuration based on the UE capability message. In some aspects, the DRX synchronization coordination configuration configures the UE 604 with the C-DRX on/off synchronization coordination with the BS 602. In turn, the UE 604 receives, from the BS 602, the DRX synchronization coordination configuration based on the UE capability message.

At 616, the UE 604 may determine that an inactivity timer associated with the DRX synchronization coordination configuration is within a threshold time to expire. For example, the threshold time may correspond to a number of slots remaining in an inactivity timer prior to expiration. In another example, the threshold time may correspond to a percentage of time remaining in the inactivity timer prior to expiration. In still other examples, the threshold time may define a specified amount of time prior to expiration of the inactivity timer.

At 618, the UE 604 may transmit, to the BS 602, special uplink signaling indicating that the UE 604 intends to transition into an off duration in a DRX cycle based on the inactivity timer being within the threshold time to expire. In turn, the BS 602 receives, from the UE 604, the special uplink signaling indicating that the UE intends to transition into the off duration in the DRX cycle based on a first inactivity timer of the UE 604 being within a threshold time to expire.

At 620, the BS 602 may detect the special uplink signaling from the UE 604 indicating that the UE intends to transition into the C-DRX sleep state when the first inactivity timer of the UE 604 expires. In some aspects, the uplink signaling includes one or more of special channel state information (CSI), a special physical random access channel (PRACH) transmission, a sounding reference signal (SRS) transmission, or a medium access control (MAC) control element (MAC-CE). In some aspects, the special CSI includes special CSI content not defined in normal CSI content. In some aspects, the special PRACH transmission includes a reserved preamble sequence reserved for DRX synchronization coordination. In some aspects, the special SRS transmission includes a muted SRS transmission or one or more muted SRS port transmissions.

At 622, the BS 602 may transmit, to the UE 604, a C-DRX command that causes the UE 604 to transition into the off duration of the DRX cycle prior to expiration of the first inactivity timer. In turn, the UE 604 may transition into the off duration of the DRX cycle based on expiry of the first inactivity timer and transmission of the uplink signaling. In some aspects, the BS 602 may transition into the off duration of the DRX cycle based on expiry of a second inactivity timer of the BS 602 and detection of the received uplink signaling.

By transmitting the indication that the UE 604 intends to transition into the off duration of the DRX cycle based on its local inactivity timer being within the threshold time to expire, the network entity can synchronize its local inactivity timer with that of the UE 604, such that both the UE 604 and BS 602 can coordinate the synchronization between their respective on/off C-DRX states. Accordingly, this allows the BS 602 and UE 604 to keep their C-DRX on/off state synchronized with one another to avoid performance loss due to a mismatch in a weak RF environment, resulting in battery and energy savings for both the UE 604 and network.

Figure 7:
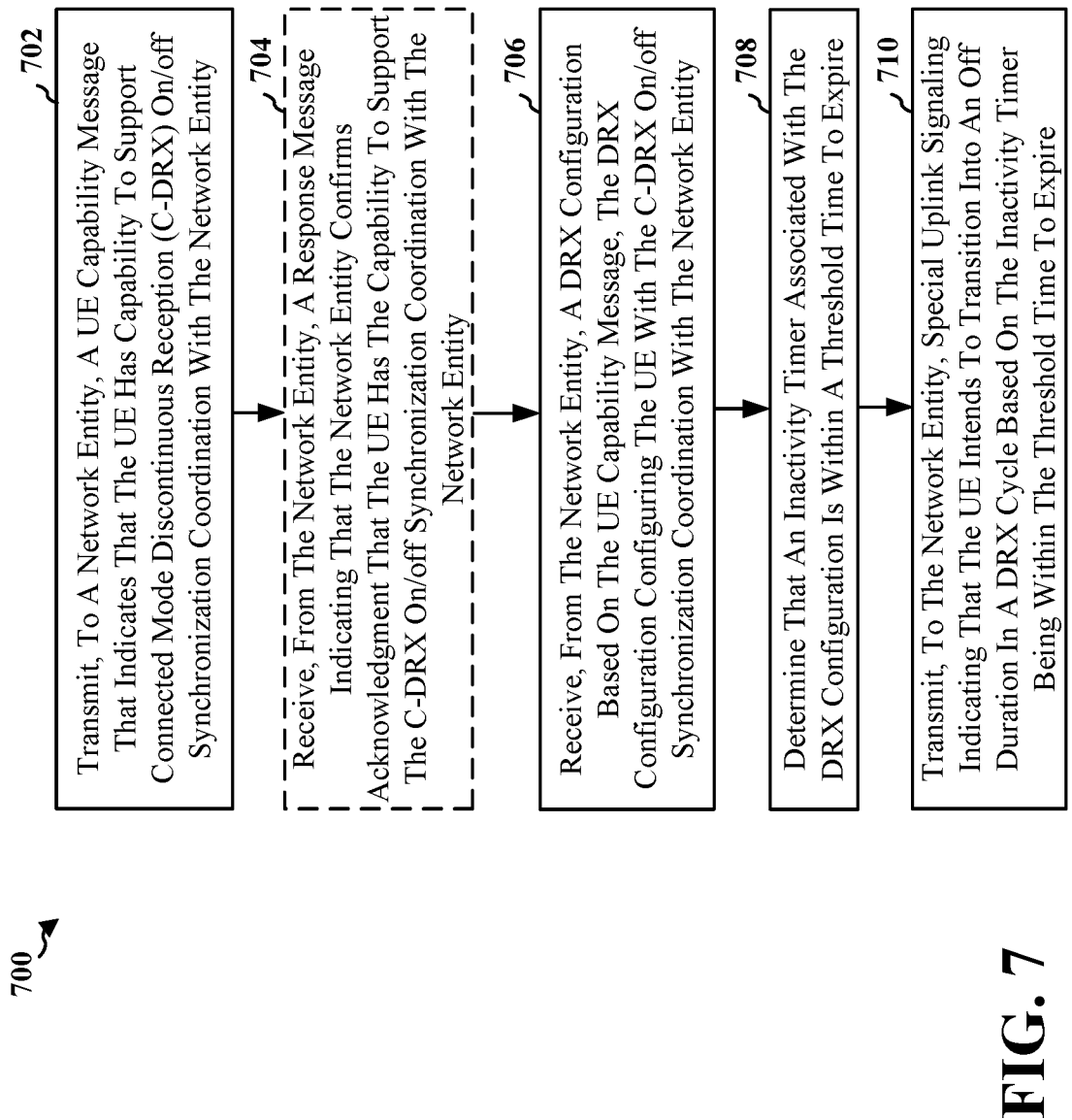
FIG. 7 is a flowchart illustrating a process of wireless communication that supports C-DRX on/off synchronization coordination between user equipment and network in accordance with some aspects of the present disclosure.

FIG. 7 is a flowchart 700 illustrating a process of wireless communication that supports C-DRX on/off synchronization coordination between user equipment and network in accordance with some aspects of the present disclosure. The process may be performed by a UE (e.g., UE 104, 350, 404a, 404b, 604, the apparatus 702, the processing system 714, which may include the memory 360 and which may be the entire UE 350 or a component of the UE 350, such as the TX processor 368, the RX processor 356, and/or the controller/processor 359). Optional aspects are illustrated in dashed lines.

At 702, the UE may transmit, to a network entity, a UE capability message that indicates that the UE has capability to support C-DRX on/off synchronization coordination with the network entity. For example, 702 may be performed by capability information component 812 of FIG. 8. In the context of FIGS. 1 and 6, for example, the UE 104/604 may transmit the UE capability message to the base station 102/602.

At 704, the UE may receive, from the network entity, a response message indicating that the network entity confirms acknowledgment that the UE has the capability to support the C-DRX on/off synchronization coordination with the network entity. For example, 704 may be performed by monitor component 808 of FIG. 8 in coordination with the reception component 804 of FIG. 8. In the context of FIGS. 1 and 6, for example, the UE 104/604 may receive the response message from the base station 102/602.

At 706, the UE may receive, from the network entity, a DRX synchronization coordination configuration based on the UE capability message, the DRX synchronization coordination configuration configuring the UE with the C-DRX on/off synchronization coordination with the network entity. For example, 706 may be performed by the monitor component 808 of FIG. 8 in coordination with reception component 804 of FIG. 8. In the context of FIGS. 1 and 6, for example, the UE 104/604 may receive the DRX synchronization coordination configuration from the base station 102/602.

At 708, the UE may determine that an inactivity timer associated with the DRX synchronization coordination configuration is within a threshold time to expire. For example, 708 may be performed by determination component 810 of FIG. 8 in coordination with inactivity timer component 814 of FIG. 8. In the context of FIGS. 1 and 6, for example, the UE 104/604 may determine that the inactivity timer associated with the DRX synchronization coordination configuration is within the threshold time to expire.

At 710, the UE may transmit, to the network entity, uplink signaling indicating that the UE intends to transition into an off duration in a DRX cycle based on the inactivity timer being within the threshold time to expire. For example, 710 may be performed by determination component 810 of FIG. 8 in coordination with transmission component 806 of FIG. 8. In the context of FIGS. 1 and 6, for example, the UE 104/604 may transmit the special uplink signaling to the base station 102/602.

Figure 8:
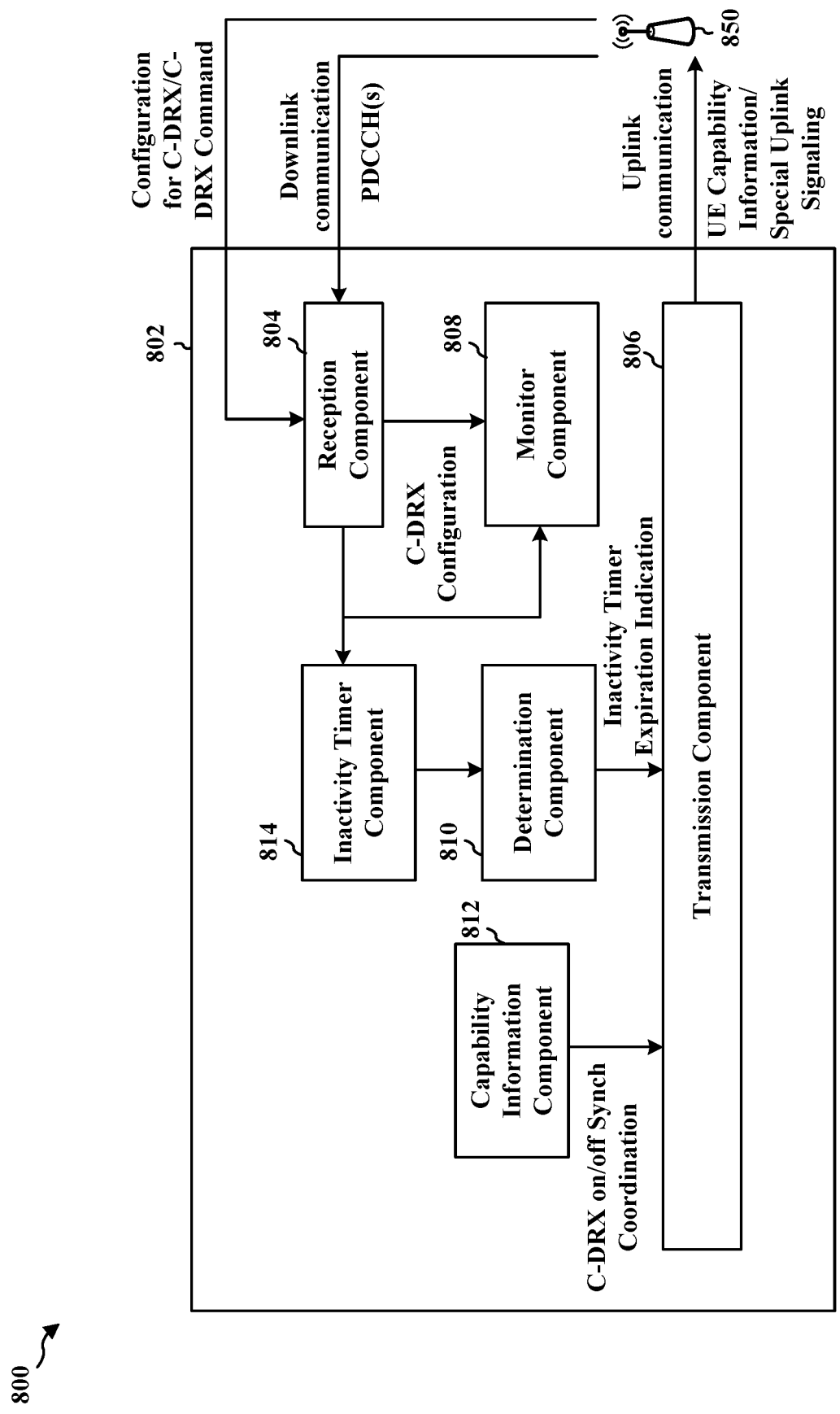
FIG. 8 is a conceptual data flow diagram illustrating the data flow between different components in an example apparatus in accordance with some aspects of the present disclosure.

FIG. 8 is a conceptual data flow diagram 800 illustrating the data flow between different means/components in an example apparatus 802. The apparatus 802 may be a UE or a component of a UE (e.g., such as UE 104, 350, 404a, 404b, 504). The apparatus 802 may include a reception component 804, a transmission component 806, a monitor component 808, a determination component 810, and a capability information component 812.

The reception component 804 may be configured to receive signals and/or other information from other devices including, e.g., base station 850. The signals/information received by the reception component 804 may be provided to one or more components of the apparatus 802 for further processing and use in performing various operations in accordance with the methods discussed supra including the process of flowchart 600. Thus, via the reception component 804, the apparatus 802 and/or one or more components therein receive signals and/or other information (e.g., such as data for the apparatus 802, DRX configurations and/or other control signaling) from the base station 850 as discussed supra and also discussed more specifically infra.

The transmission component 806 may be configured to transmit various messages to one or more external devices, e.g., including the base station 850, in accordance with the methods disclosed herein. The messages/signals to be transmitted may be generated by one or more other components as discussed above, or the messages/signals to be transmitted may be generated by the transmission component 806 under the direction/control of the one or more other components discussed supra. Thus, in various configurations, via the transmission component 806, the apparatus 802 and/or one or more components therein transmit signals and/or other information (e.g., such as UE capability information, special uplink signaling, control messages and/or other signals) to external devices such as the base station 850. In one implementation, the capability information component 812 may be further configured to transmit (e.g., via the transmission component 806) UE capability information including indication that the UE has capability to support C-DRX on/off synchronization coordination with the base station 850, e.g., as described in connection with block 702 of FIG. 7.

In some implementations, the monitor component 808 may be configured to receive, from the network entity, a response message indicating that the network entity confirms acknowledgment that the UE has the capability to support the C-DRX on/off synchronization coordination with the network entity, e.g., as described in connection with block 704 of FIG. 7. Additionally, the monitor component 808 may be configured to receive, from the network entity, a DRX synchronization coordination configuration based on the UE capability message, the DRX synchronization coordination configuration configuring the UE with the C-DRX on/off synchronization coordination with the network entity, e.g., as described in connection with block 706 of FIG. 7. In some implementations, the monitor component 808 may be configured to monitor and receive (e.g., via the reception component 804 from the base station 850) a PDCCH during the on duration of the C-DRX cycle.

The determination component 810, in coordination with the inactivity timer component 814, may be configured to determine that an inactivity timer associated with the DRX synchronization coordination configuration is within a threshold time to expire, e.g., as described in connection with block 708 of FIG. 7. Additionally, the determination component 810 may be configured to transmit, to the network entity, uplink signaling indicating that the UE intends to transition into an off duration in a DRX cycle based on the inactivity timer being within the threshold time to expire, e.g., as described in connection with block 710 of FIG. 7.

The apparatus 802 may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
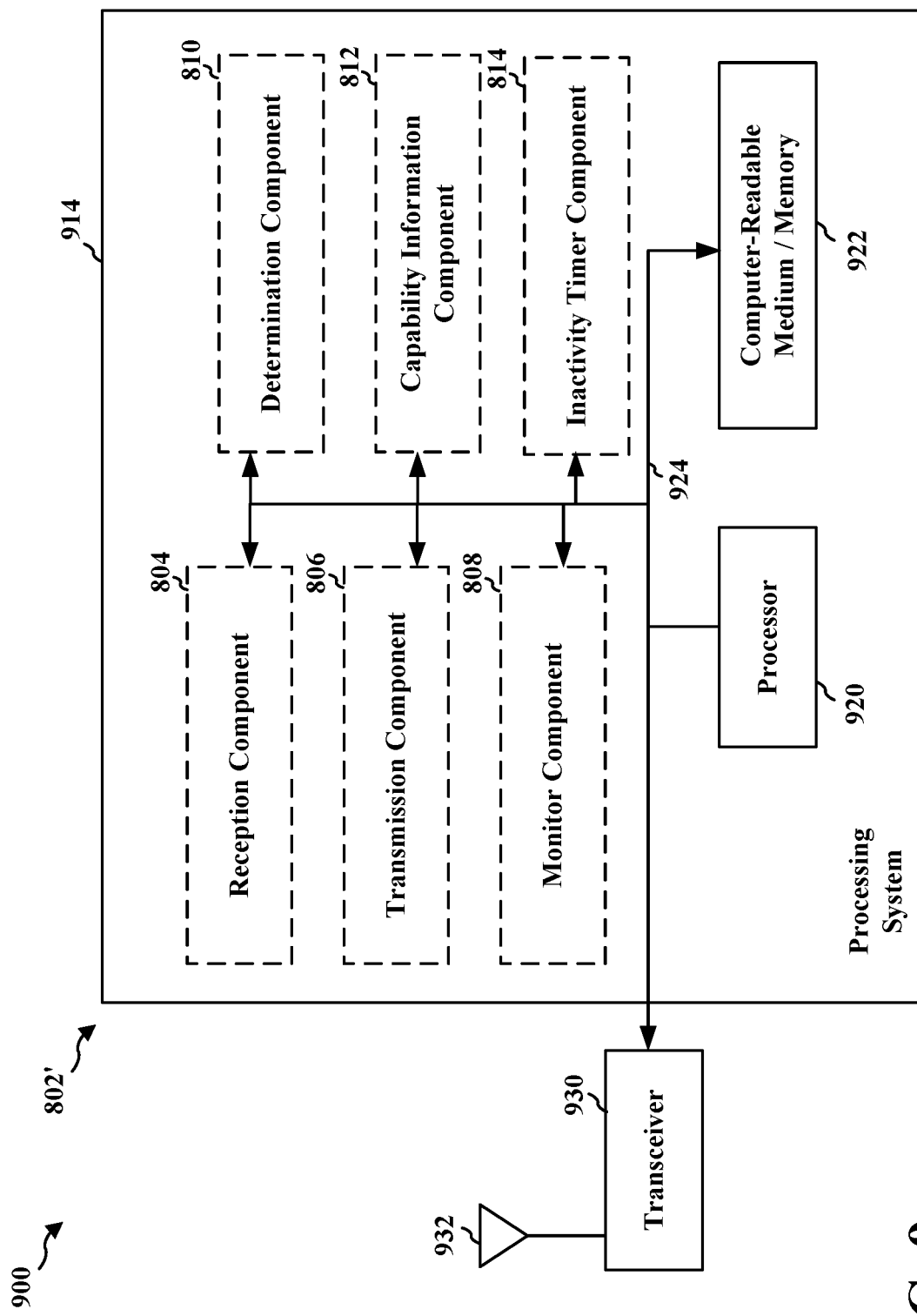
FIG. 9 is a diagram illustrating an example of a hardware implementation for an apparatus employing a processing system in accordance with some aspects of the present disclosure.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814 and the computer-readable medium/memory 922. The bus 924 may also link various other circuits such as timing sources, peripherals, voltage regulators, and power management circuits, which are well known in the art, and therefore, will not be described any further.

The processing system 914 may be coupled to a transceiver 930. The transceiver 930 is coupled to one or more antennas 932. The transceiver 930 provides a means for communicating with various other apparatus over a transmission medium. The transceiver 930 receives a signal from the one or more antennas 932, extracts information from the received signal, and provides the extracted information to the processing system 914, specifically the reception component 804. In addition, the transceiver 930 receives information from the processing system 914, specifically the transmission component 816, and based on the received information, generates a signal to be applied to the one or more antennas 932. The processing system 914 includes a processor 920 coupled to a computer-readable medium/memory 922. The processor 920 is responsible for general processing, including the execution of software stored on the computer-readable medium/memory 922. The software, when executed by the processor 920, causes the processing system 914 to perform the various functions described supra for any particular apparatus. The computer-readable medium/memory 922 may also be used for storing data that is manipulated by the processor 920 when executing software. The processing system 914 further includes at least one of the components 804, 806, 808, 810, 812, 814. The components may be software components running in the processor 920, resident/stored in the computer-readable medium/memory 922, one or more hardware components coupled to the processor 920, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' is a UE for wireless communication including means for performing the aspects described in connection with FIGS. 6-8. For example, in one configuration, the UE may comprise means for transmitting, to a network entity, a UE capability message that indicates that the UE has capability to support C-DRX on/off synchronization coordination with the network entity. In one configuration, the UE may further comprise means for receiving, from the network entity, a DRX synchronization coordination configuration based on the UE capability message, the DRX synchronization coordination configuration configuring the UE with the C-DRX on/off synchronization coordination with the network entity. In one configuration, the UE may further comprise means for determining that an inactivity timer associated with the DRX synchronization coordination configuration is within a threshold time to expire. In one configuration, the UE may further comprises means for transmitting, to the network entity, uplink signaling indicating that the UE intends to transition into an off duration in a DRX cycle based on the inactivity timer being within the threshold time to expire.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
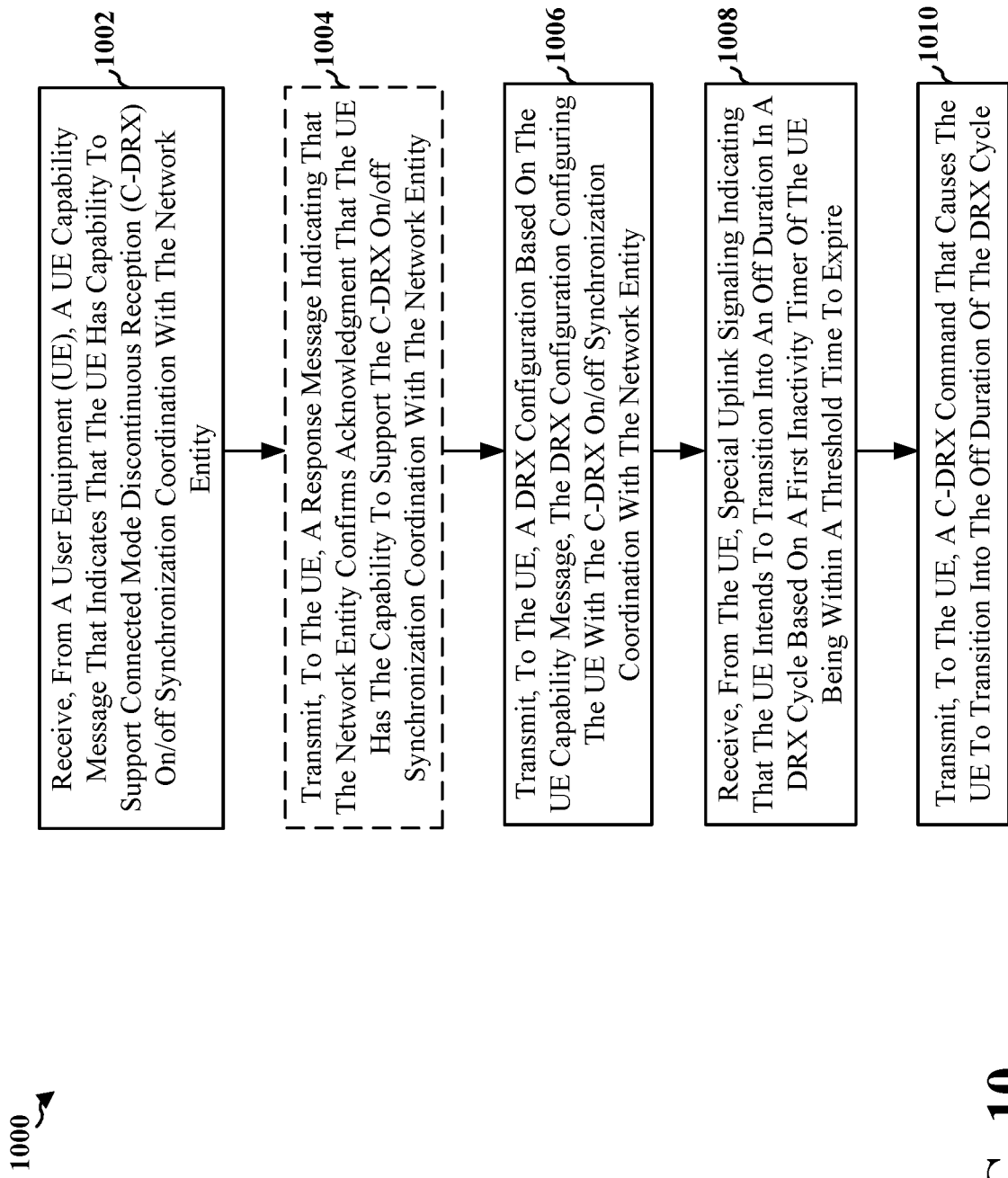
FIG. 10 is a flowchart illustrating a process of wireless communication that supports C-DRX on/off synchronization coordination between user equipment and network in accordance with some aspects of the present disclosure.

FIG. 10 is a flowchart 1000 of an example method of wireless communication in accordance with aspects presented herein. The method may be performed by a network entity (e.g., base station 102, 180, 310, 602, the apparatus 1002, the processing system 1214, which may include the memory 376 and which may be the entire base station 310 or a component of the base station 310, such as the TX processor 316, the RX processor 370, and/or the controller/processor 375). Optional aspects are illustrated in dashed lines.

At 1002, the network entity may receive a UE capability message that indicates that the UE has capability to support C-DRX on/off synchronization coordination with the network entity. For example, 1002 may be performed by reception component 1104 of FIG. 11 in coordination with the configuration component 1112 of FIG. 11. In the context of FIGS. 1 and 6, for example, the BS 102/602 may receive the UE capability message from the UE 104/604. In various aspects, the BS may receive the UE capability message during a RRC connected mode with the UE.

At 1004, the BS may transmit, to the UE, a response message indicating that the network entity confirms acknowledgment that the UE has the capability to support the C-DRX on/off synchronization coordination with the network entity. For example, 1006 may be performed by the configuration component 1112 in conjunction with the transmission component 1106 of FIG. 11. In the context of FIGS. 1 and 6, for example, the BS 102/602 may transmit the response message to the UE 104/604.

At 1006, the BS may transmit, to the UE, a DRX synchronization coordination configuration based on the UE capability message, the DRX synchronization coordination configuration configuring the UE with the C-DRX on/off synchronization coordination with the network entity. For example, 1006 may be performed by the configuration component 1112 of FIG. 11 in coordination with the transmission component 1106 of FIG. 11. In the context of FIGS. 1 and 6, for example, the BS 102/602 may transmit the DRX synchronization coordination configuration to the UE 104/604. In some aspects, the DRX synchronization coordination configuration includes a C-DRX configuration that configures the UE to perform in a C-DRX mode and enables the UE to perform the C-DRX on/off synchronization coordination with the network entity.

At 1008, the BS may receive, from the UE, uplink signaling indicating that the UE intends to transition into an off duration in a DRX cycle based on a first inactivity timer of the UE being within a threshold time to expire. For example, 1008 may be performed by determination component 1110 of FIG. 11 in coordination with the reception component 1104 of FIG. 11. In the context of FIGS. 1 and 6, for example, the BS 102/602 may receive the uplink signaling from the UE 104/604. In one example, the uplink signaling may indicate a number of time slots remaining in the inactivity timer prior to expiration. In another example, the uplink signaling may indicate a percentage of time remaining in the inactivity timer prior to expiration. By receiving indication that the UE is intended to transition into the off duration of the DRX cycle based on its local inactivity timer being within the threshold time to expire, the BS can synchronize its local inactivity timer with that of the UE such that both the UE and BS can coordinate the synchronization between their respective on/off C-DRX states.

At 1010, the BS may transmit, to the UE, a C-DRX command that causes the UE to transition into the off duration of the DRX cycle prior to expiration of the inactivity timer of the UE. For example, 1010 may be performed by the command component 1114 of FIG. 11. In the context of FIGS. 1 and 6, for example, the BS 102/602 may transmit the C-DRX command to the UE 104/604. By forcing the UE to transition into the C-DRX off duration (or sleep state), the BS can also transition into its own sleep state while resetting its local inactivity timer in line with the inactivity timer of the UE, which enables both the UE and BS to become synchronized in terms of their on/off C-DRX states.

Figure 11:
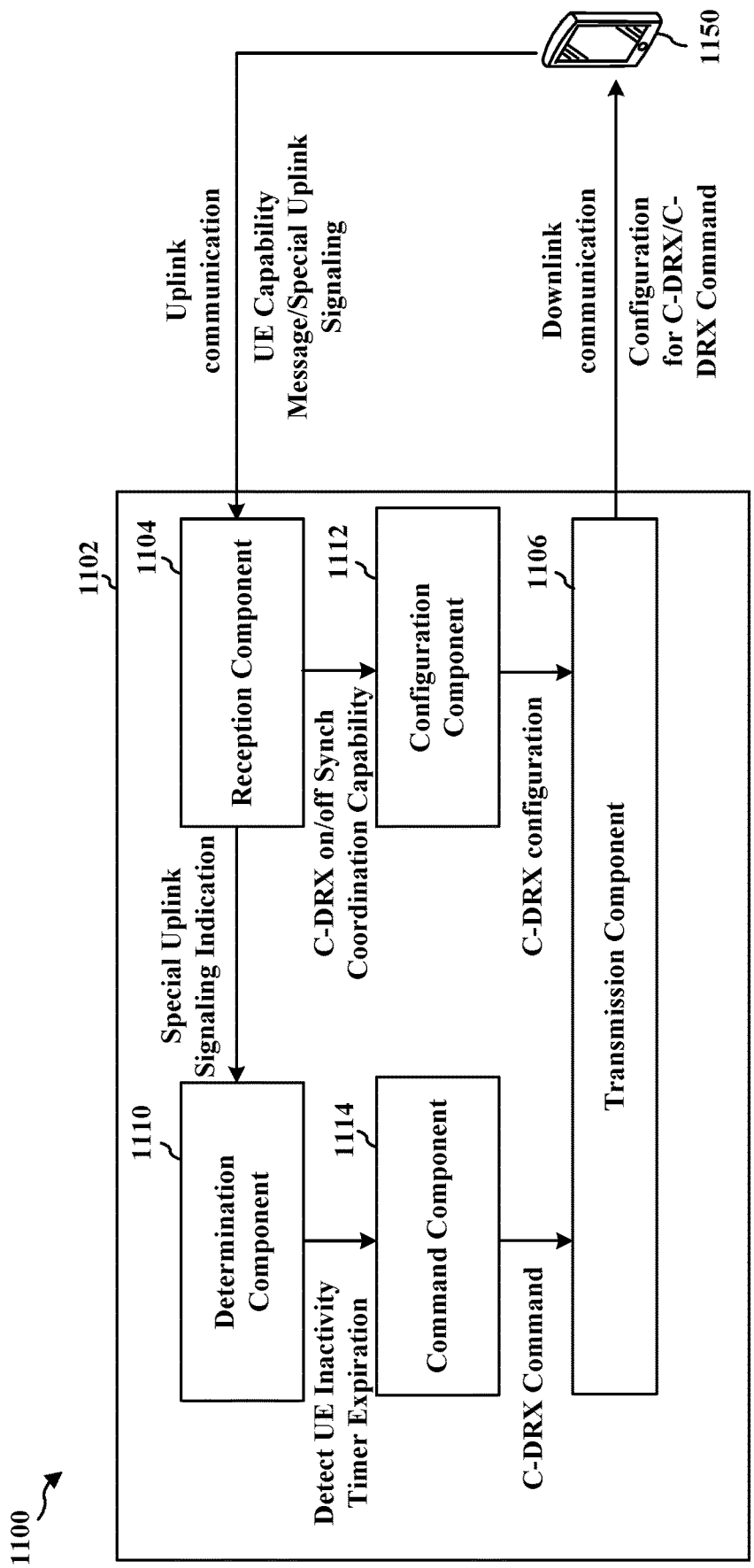
FIG. 11 is a conceptual data flow diagram illustrating the data flow between different components in an example apparatus in accordance with some aspects of the present disclosure.

FIG. 11 is a conceptual data flow diagram 1100 illustrating the data flow between different means/components in an example apparatus 1102. The apparatus may be a base station or a component of a base station (e.g., such as base station 102, 180, 310, 502). For the purpose of discussion, we may consider that the apparatus 1102 may correspond to the base station 112 shown in FIG. 1. The apparatus 1102 may include a reception component 1104, a transmission component 1106, a determination component 1110, a configuration component 1112 and a command component 1114.

The reception component 1104 may be configured to receive signals and/or other information from other devices including, e.g., UE 1150. The signals/information received by the reception component 1104 may be provided to one or more components of the apparatus 1102 for further processing and use in performing various operations in accordance with the methods discussed supra including the method of flowchart 1000. Thus, via the reception component 1104, the apparatus 1102 and/or one or more component therein receive signals and/or other information (e.g., such as UE capability information, special uplink signaling, control messages and/or other signals), from the UE 1150 as discussed supra and also discussed more specifically infra. In one implementation, the reception component 1104 may receive, from a UE (e.g., 104, 404a, 404b, 504), a UE capability message that indicates that the UE has capability to support connected mode discontinuous reception (C-DRX) on/off synchronization coordination with the network entity, e.g., as described in connection with 1002 of FIG. 10. In various aspects, the network entity may receive the UE capability message during a RRC connected mode with the UE.

The determination component 1110 may determine that the UE has capability to support connected mode discontinuous reception (C-DRX) on/off synchronization coordination with the network entity. In some aspects, network entity may transmit, via the transmission component 1106, to the UE, a response message indicating that the network entity confirms acknowledgment that the UE has the capability to support the C-DRX on/off synchronization coordination with the network entity, e.g., as described in connection with block 1004 of FIG. 10.

The determination component 1110 also may receive, via the reception component 1104, from the UE 1150, uplink signaling indicating that the UE 1150 intends to transition into an off duration in a DRX cycle based on a first inactivity timer of the UE 1150 being within a threshold time to expire, e.g., as described in connection with block 1008 of FIG. 10. In some aspects, the determination component 1110 may detect that the uplink signaling includes one or more of channel state information, a scheduling request, a sounding reference signal transmission, or a MAC-CE. For example, the channel state information may be periodical CSI (P-CSI) messages that indicate the UE 1150 is intending to transition into a C-DRX off duration (or sleep state). In some aspects, the P-CSI may include a muted CSI. In other aspects, the P-CSI messages may include additional and/or specially repurposed bits containing CSI content that indicates such UE transition into the C-DRX off duration. In another example, the SR may indicate the UE transition into the C-DRX off duration. In some aspects, the determination component 1110 may detect that the received uplink signaling indicates a number of time slots remaining in the first inactivity timer of the UE prior to expiration or a percentage of time remaining in the first inactivity timer prior to expiration. In some aspects, the determination component 1110 may determine that a local second inactivity timer of the network entity is expiring. In this regard, the determination component 1110 may cause the network entity to transition into the off duration of the DRX cycle based on expiry of the second inactivity timer of the network entity and detection of the received uplink signaling.

The transmission component 1106 may be configured to transmit the above discussed information to one or more external devices, e.g., including the UE 1150, in accordance with the methods disclosed herein. The information to be transmitted may be included in messages/signals generated by one or more other components discussed above, or the messages/signals to be transmitted may be generated by the transmission component 1106 under the direction/control of the one or more other components discussed supra. Thus, in various configurations, via the transmission component 1106, the apparatus 1102 and/or one or more component therein transmit signals including the above discussed information (e.g., such as data for the apparatus 602, DRX configurations and/or other control signaling), to external devices such as the UE 1150.

The configuration component 1112 may transmit, via the transmission component 1106, to the UE 1150, a DRX synchronization coordination configuration based on the UE capability message, e.g., as described in connection with block 1006 of FIG. 10. In some aspects, the DRX synchronization coordination configuration configures the UE 1150 with the C-DRX on/off synchronization coordination with the network entity. In some aspects, the DRX synchronization coordination configuration includes a C-DRX configuration that configures the UE 1150 to perform in a C-DRX mode and enables the UE to perform the C-DRX on/off synchronization coordination with the network entity.

In one or more implementations, the configuration component 1112 may receive, via the reception component 1104, from the UE 1150, an uplink MAC-CE message that includes a request to release the C-DRX configuration by RRC signaling based on one or more of a quality-of-service configuration of the UE 1150, a battery status of the UE 1150, or a buffer size of the UE. In this regard, the configuration component 1112 may transmit, to the UE 1150, an RRC reconfiguration message that includes a configuration to release the UE 1150 from the C-DRX configuration based on the received MAC-CE release request from the UE.

The command component 1114 may transmit, to the UE 1150, a C-DRX command that causes the UE 1150 to transition into the off duration of the DRX cycle prior to expiration of the inactivity timer based on the received uplink signaling, e.g., as described in connection with block 1010 of FIG. 10. In some configurations, the indication may be transmitted, e.g., dynamically through a MAC-CE signal to the UE 1150.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
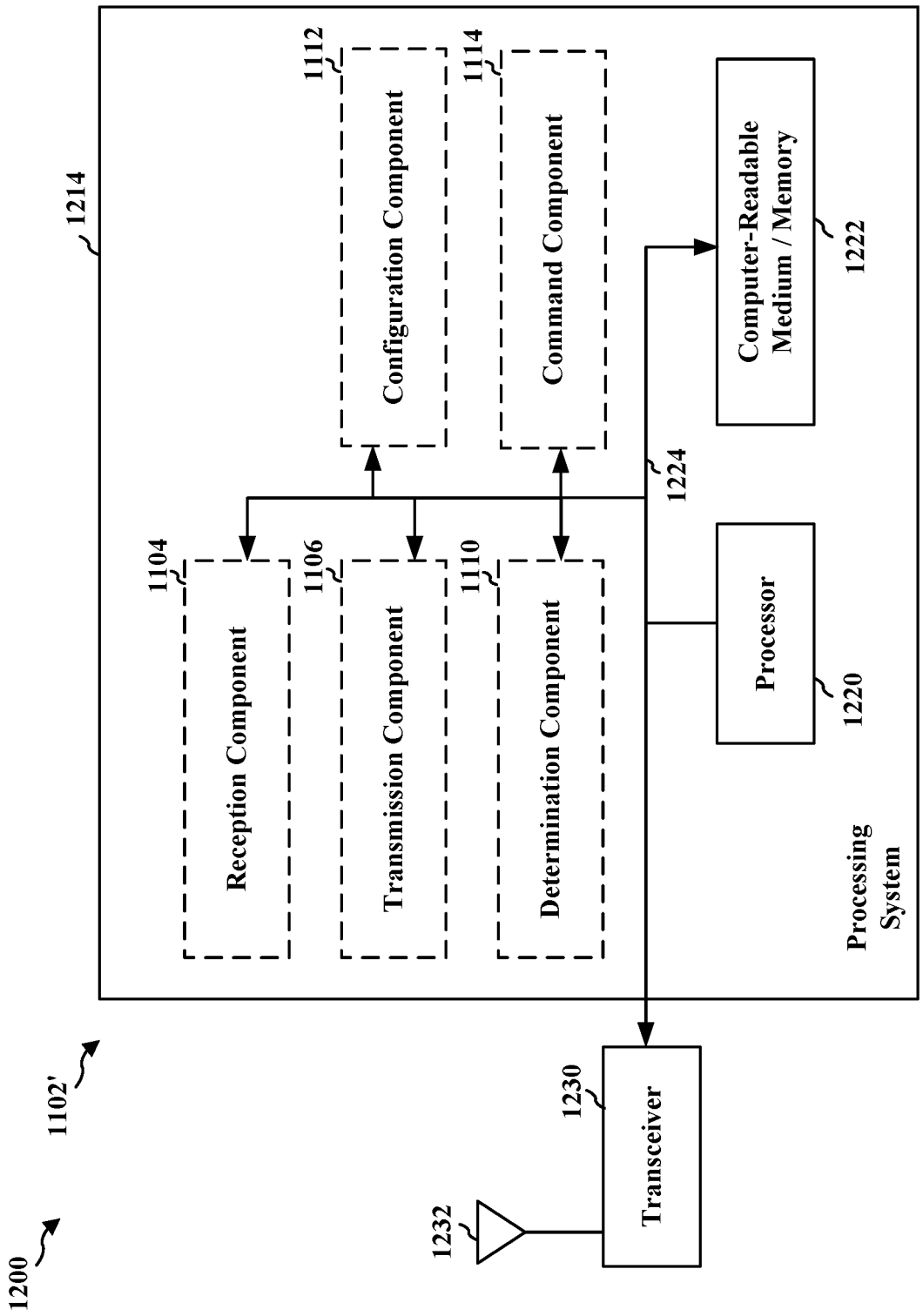
FIG. 12 is a diagram illustrating an example of a hardware implementation for an apparatus employing a processing system in accordance with some aspects of the present disclosure.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1220, the components 1104, 1106, 1110, 1112, 1114 and the computer-readable medium/memory 1222. The bus 1224 may also link various other circuits such as timing sources, peripherals, voltage regulators, and power management circuits, which are well known in the art, and therefore, will not be described any further.

The processing system 1214 may be coupled to a transceiver 1230. The transceiver 1230 is coupled to one or more antennas 1232. The transceiver 1230 provides a means for communicating with various other apparatus over a transmission medium. The transceiver 1230 receives a signal from the one or more antennas 1232, extracts information from the received signal, and provides the extracted information to the processing system 1214, specifically the reception component 1104. In addition, the transceiver 1230 receives information from the processing system 1214, specifically the transmission component 1106, and based on the received information, generates a signal to be applied to the one or more antennas 1232. The processing system 1214 includes a processor 1220 coupled to a computer-readable medium/memory 1222. The processor 1220 is responsible for general processing, including the execution of software stored on the computer-readable medium/memory 1222. The software, when executed by the processor 1220, causes the processing system 1214 to perform the various functions described supra for any particular apparatus. The computer-readable medium/memory 1222 may also be used for storing data that is manipulated by the processor 1220 when executing software. The processing system 1214 further includes at least one of the components 1104, 1106, 1110, 1112, 1114. The components may be software components running in the processor 1220, resident/stored in the computer readable medium/memory 1222, one or more hardware components coupled to the processor 1220, or some combination thereof. The processing system 1214 may be a component of the base station 310 and may include the memory 376 and/or at least one of the TX processor 316, the RX processor 370, and the controller/processor 375.

In one configuration, the apparatus 1102/1002' is a network entity, such as a base station, including means for receiving, from a user equipment (UE), a UE capability message that indicates that the UE has capability to support connected mode discontinuous reception (C-DRX) on/off synchronization coordination with the network entity. In some configurations, the network entity may further comprise means for transmitting, to the UE, a DRX synchronization coordination configuration based on the UE capability message, the DRX synchronization coordination configuration configuring the UE with the C-DRX on/off synchronization coordination with the network entity. In some configurations, the network entity may further comprise means for receiving, from the UE, uplink signaling indicating that the UE intends to transition into an off duration in a DRX cycle based on a first inactivity timer of the UE being within a threshold time to expire. In some configurations, the network entity may further comprise means for transmitting, to the UE, a C-DRX command that causes the UE to transition into the off duration of the DRX cycle prior to expiration of the inactivity timer of the UE.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and may be combined with aspects of other embodiments or teachings described herein, without limitation.

Example 1 is a method of wireless communication performed by a user equipment that includes transmitting, to a network entity, a UE capability message that indicates that the UE has capability to support connected mode discontinuous reception (C-DRX) on/off synchronization coordination with the network entity; receiving, from the network entity, a DRX synchronization coordination configuration based on the UE capability message, the DRX synchronization coordination configuration configuring the UE with the C-DRX on/off synchronization coordination with the network entity; determining that an inactivity timer associated with the DRX synchronization coordination configuration is within a threshold time to expire; and transmitting, to the network entity, uplink signaling indicating that the UE intends to transition into an off duration in a DRX cycle based on the inactivity timer being within the threshold time to expire.

In Example 2, the method of Example 1 further includes that the DRX synchronization coordination configuration comprises a C-DRX configuration that configures the UE to perform in a C-DRX mode and enables the UE to perform the C-DRX on/off synchronization coordination with the network entity.

In Example 3, the method of any of Examples 1 or 2 further includes transmitting the uplink signaling comprises transmitting one or more of special channel state information (CSI), a special physical random access channel (PRACH) transmission, a sounding reference signal (SRS) transmission, or a medium access control (MAC) control element (MAC-CE), wherein the special CSI comprises special CSI content not defined in normal CSI content, wherein the special PRACH transmission comprises a reserved preamble sequence reserved for DRX synchronization coordination, and wherein the special SRS transmission comprises a muted SRS transmission or one or more muted SRS port transmissions.

In Example 4, the method of any of Examples 1-3 further includes that the uplink signaling indicates a number of time slots remaining in the inactivity timer prior to expiration.

In Example 5, the method of any of Examples 1-4 further includes that the uplink signaling indicates a percentage of time remaining in the inactivity timer prior to expiration.

In Example 6, the method of any of Examples 1-5 further includes that the transmitting the uplink signaling comprises transmitting, to the network entity, a medium access control (MAC) control element (MAC-CE) comprising a request to release the C-DRX configuration by RRC signaling based on one or more of a quality-of-service configuration of the UE, a battery status of the UE, or a buffer size of the UE.

In Example 7, the method of any of Examples 1-6 further includes receiving, from the network entity, a C-DRX command that causes the UE to transition into the off duration of the DRX cycle prior to expiration of the inactivity timer based on the transmitted uplink signaling.

In Example 8, the method of Example 7 further includes that the receiving the C-DRX command comprises receiving, from the network entity, a medium access control (MAC) control element (MAC-CE) message comprising the C-DRX command.

In Example 9, the method of any of Examples 1-8 further includes that the transmitting the UE capability message comprises transmitting the UE capability message during a radio resource control (RRC) connected mode with the network entity.

In Example 10, the method of any of Examples 1-9 further includes that the receiving the DRX synchronization coordination configuration comprises receiving, from the network entity, a radio resource control (RRC) reconfiguration message comprising the DRX synchronization coordination configuration, and the RRC configuration message comprises a connected-mode DRX (C-DRX) configuration based at least in part on the UE capability message.

In Example 11, the method of Example 10 further includes receiving, from the network entity, a radio resource control (RRC) reconfiguration message comprising a request to the UE to release the C-DRX configuration based on the transmitted uplink signaling.

In Example 12, the method of any of Examples 1-11 further includes monitoring a physical downlink control channel (PDCCH) while the inactivity timer is not expired.

In Example 13, the method of any of Examples 1 further includes transitioning into the off duration of the DRX cycle based on expiry of the inactivity timer and transmission of the uplink signaling.

In Example 14, the method of Example 1 further includes receiving, from the network entity, a response message indicating that the network entity confirms acknowledgment that the UE has the capability to support the C-DRX on/off synchronization coordination with the network entity.

Example 15 is a device including one or more processors and one or more memories in electronic communication with the one or more processors storing instructions executable by the one or more processors to cause a system or an apparatus to implement a method as in any of Examples 1 to 14.

Example 16 is a system or apparatus including means for implementing a method or realizing an apparatus as in any of Examples 1 to 14.

Example 17 is a non-transitory computer-readable medium storing instructions executable by one or more processors to cause the one or more processors to implement a method as in any of Examples 1 to 14.

Example 18 is a method of wireless communication performed by a network entity includes receiving, from a user equipment (UE), a UE capability message that indicates that the UE has capability to support connected mode discontinuous reception (C-DRX) on/off synchronization coordination with the network entity; transmitting, to the UE, a DRX synchronization coordination configuration based on the UE capability message, the DRX synchronization coordination configuration configuring the UE with the C-DRX on/off synchronization coordination with the network entity; receiving, from the UE, uplink signaling indicating that the UE intends to transition into an off duration in a DRX cycle based on a first inactivity timer of the UE being within a threshold time to expire; and transmitting, to the UE, a C-DRX command that causes the UE to transition into the off duration of the DRX cycle prior to expiration of the first inactivity timer.

In Example 19, the method of Example 18 further includes transitioning into the off duration of the DRX cycle based on expiry of a second inactivity timer of the network entity and detection of the received uplink signaling.

In Example 20, the method of any of Examples 18 or 19 further includes that the receiving the uplink signaling comprises receiving one or more of special channel state information (CSI), a special physical random access channel (PRACH) transmission, a sounding reference signal (SRS) transmission, or a medium access control (MAC) control element (MAC-CE), wherein the special CSI comprises special CSI content not defined in normal CSI content, wherein the special PRACH transmission comprises a reserved preamble sequence reserved for DRX synchronization coordination, and wherein the special SRS transmission comprises a muted SRS transmission or one or more muted SRS port transmissions.

In Example 21, the method of any of Examples 18-20 further includes that the receiving the uplink signaling comprises receiving, from the UE, a medium access control (MAC) control element (MAC-CE) comprising a request to release the C-DRX configuration by RRC signaling based on one or more of a quality-of-service configuration of the UE, a battery status of the UE, or a buffer size of the UE.

In Example 22, the method of any of Examples 18-21 further includes detecting that the received uplink signaling indicates a number of time slots remaining in the first inactivity timer prior to expiration or a percentage of time remaining in the first inactivity timer prior to expiration.

In Example 23, the method of Example 22 further includes that the transmitting the C-DRX command comprises transmitting, to the UE, a medium access control (MAC) control element (MAC-CE) message comprising the C-DRX command.

In Example 24, the method of any of Examples 18-23 further includes that the receiving the UE capability message comprises receiving the UE capability message during a radio resource control (RRC) connected mode with the UE.

In Example 25, the method of Example 24 further includes transmitting, to the UE, a radio resource control (RRC) reconfiguration message comprising a request to the UE to release the C-DRX configuration based on the received uplink signaling.

In Example 26, the method of any of Examples 18-25 further includes that the DRX synchronization coordination configuration comprises a C-DRX configuration that configures the UE to perform in a C-DRX mode and enables the UE to perform the C-DRX on/off synchronization coordination with the network entity.

In Example 27, the method of any of Examples 18-26 further includes transmitting, to the UE, a response message indicating that the network entity confirms acknowledgment that the UE has the capability to support the C-DRX on/off synchronization coordination with the network entity.

Example 28 is a device including one or more processors and one or more memories in electronic communication with the one or more processors storing instructions executable by the one or more processors to cause a system or an apparatus to implement a method as in any of Examples 18 to 27.

Example 29 is a system or apparatus including means for implementing a method or realizing an apparatus as in any of Examples 18 to 27.

Example 30 is a non-transitory computer-readable medium storing instructions executable by one or more processors to cause the one or more processors to implement a method as in any of Examples 18 to 27.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), the method comprising:
    transmitting, to a network entity, a UE capability message that indicates that the UE has capability to support connected mode discontinuous reception (C-DRX) on/off synchronization coordination with the network entity;
    receiving, from the network entity, a DRX synchronization coordination configuration based on the UE capability message, the DRX synchronization coordination configuration configuring the UE with the C-DRX on/off synchronization coordination with the network entity;
    determining that an inactivity timer associated with the DRX synchronization coordination configuration is within a threshold time to expire; and
    transmitting, to the network entity, uplink signaling indicating that the UE intends to transition into an off duration in a DRX cycle based on the inactivity timer being within the threshold time to expire.

2. The method of claim 1, wherein the DRX synchronization coordination configuration comprises a C-DRX configuration that configures the UE to perform in a C-DRX mode and enables the UE to perform the C-DRX on/off synchronization coordination with the network entity.

3. The method of claim 1, wherein the transmitting the uplink signaling comprises transmitting one or more of special channel state information (CSI), a special physical random access channel (PRACH) transmission, a special sounding reference signal (SRS) transmission, or a medium access control (MAC) control element (MAC-CE), wherein the special CSI comprises special CSI content not defined in normal CSI content, wherein the special PRACH transmission comprises a reserved preamble sequence reserved for DRX synchronization coordination, and wherein the special SRS transmission comprises a muted SRS transmission or one or more muted SRS port transmissions.

4. The method of claim 1, wherein the uplink signaling indicates a number of time slots remaining in the inactivity timer prior to expiration.

5. The method of claim 1, wherein the uplink signaling indicates a percentage of time remaining in the inactivity timer prior to expiration.

6. The method of claim 1, wherein the transmitting the uplink signaling comprises transmitting, to the network entity, a medium access control (MAC) control element (MAC-CE) comprising a request to release the C-DRX configuration by RRC signaling based on one or more of a quality-of-service configuration of the UE, a battery status of the UE, or a buffer size of the UE.

7. The method of claim 1, further comprising receiving, from the network entity, a C-DRX command that causes the UE to transition into the off duration of the DRX cycle prior to expiration of the inactivity timer based on the transmitted uplink signaling.

8. The method of claim 7, wherein the receiving the C-DRX command comprises receiving, from the network entity, a medium access control (MAC) control element (MAC-CE) message comprising the C-DRX command.

9. The method of claim 1, wherein the transmitting the UE capability message comprises transmitting the UE capability message during a radio resource control (RRC) connected mode with the network entity.

10. The method of claim 1, wherein:
the receiving the DRX synchronization coordination configuration comprises receiving, from the network entity, a radio resource control (RRC) reconfiguration message comprising the DRX synchronization coordination configuration, and
the RRC configuration message comprises a connected-mode DRX (C-DRX) configuration based at least in part on the UE capability message.

11. The method of claim 10, further comprising receiving, from the network entity, a radio resource control (RRC) reconfiguration message comprising a request to the UE to release the C-DRX configuration based on the transmitted uplink signaling.

12. The method of claim 1, further comprising:
receiving, from the network entity, a response message indicating that the network entity confirms acknowledgment that the UE has the capability to support the C-DRX on/off synchronization coordination with the network entity.

13. A method of wireless communication performed by a network entity, the method comprising:
receiving, from a user equipment (UE), a UE capability message that indicates that the UE has capability to support connected mode discontinuous reception (C-DRX) on/off synchronization coordination with the network entity;
transmitting, to the UE, a DRX synchronization coordination configuration based on the UE capability message, the DRX synchronization coordination configuration configuring the UE with the C-DRX on/off synchronization coordination with the network entity;
receiving, from the UE, uplink signaling indicating that the UE intends to transition into an off duration in a DRX cycle based on a first inactivity timer of the UE being within a threshold time to expire; and
transmitting, to the UE, a C-DRX command that causes the UE to transition into the off duration of the DRX cycle prior to expiration of the first inactivity timer.

14. The method of claim 13, further comprising transitioning into the off duration of the DRX cycle based on expiry of a second inactivity timer of the network entity and detection of the received uplink signaling.

15. The method of claim 13, wherein the receiving the uplink signaling comprises receiving one or more of special channel state information (CSI), a special physical random access channel (PRACH) transmission, a sounding reference signal (SRS) transmission, or a medium access control (MAC) control element (MAC-CE), wherein the special CSI comprises special CSI content not defined in normal CSI content, wherein the special PRACH transmission comprises a reserved preamble sequence reserved for DRX synchronization coordination, and wherein the special SRS transmission comprises a muted SRS transmission or one or more muted SRS port transmissions.

16. The method of claim 13, wherein the receiving the uplink signaling comprises receiving, from the UE, a medium access control (MAC) control element (MAC-CE) comprising a request to release the C-DRX configuration by RRC signaling based on one or more of a quality-of-service configuration of the UE, a battery status of the UE, or a buffer size of the UE.

17. The method of claim 13, further comprising detecting that the received uplink signaling indicates a number of time slots remaining in the first inactivity timer prior to expiration or a percentage of time remaining in the first inactivity timer prior to expiration.

18. The method of claim 17, wherein the transmitting the C-DRX command comprises transmitting, to the UE, a medium access control (MAC) control element (MAC-CE) message comprising the C-DRX command.

19. The method of claim 13, wherein the receiving the UE capability message comprises receiving the UE capability message during a radio resource control (RRC) connected mode with the UE.

20. The method of claim 19, further comprising transmitting, to the UE, a radio resource control (RRC) reconfiguration message comprising a request to the UE to release the C-DRX configuration based on the received uplink signaling.

21. The method of claim 13, wherein the DRX synchronization coordination configuration comprises a C-DRX configuration that configures the UE to perform in a C-DRX mode and enables the UE to perform the C-DRX on/off synchronization coordination with the network entity.

22. The method of claim 13, further comprising:
transmitting, to the UE, a response message indicating that the network entity confirms acknowledgment that the UE has the capability to support the C-DRX on/off synchronization coordination with the network entity.

23. An apparatus for wireless communication at a user equipment (UE), comprising:
a memory; and
at least one processor coupled to the memory and configured to:
transmit, to a network entity, a UE capability message that indicates that the UE has capability to support connected mode discontinuous reception (C-DRX) on/off synchronization coordination with the network entity;
receive, from the network entity, a DRX synchronization coordination configuration based on the UE capability message, the DRX synchronization coordination configuration configuring the UE with the C-DRX on/off synchronization coordination with the network entity;

determine that an inactivity timer associated with the DRX synchronization coordination configuration is within a threshold time to expire; and transmit, to the network entity, uplink signaling indicating that the UE intends to transition into an off duration in a DRX cycle based on the inactivity timer being within the threshold time to expire.

24. The apparatus of claim 23, wherein the DRX synchronization coordination configuration comprises a C-DRX configuration that configures the UE to perform in a C-DRX mode and enables the UE to perform the C-DRX on/off synchronization coordination with the network entity.

25. The apparatus of claim 23, wherein the at least one processor is further configured to receive, from the network entity, a response message indicating that the network entity confirms acknowledgment that the UE has the capability to support the C-DRX on/off synchronization coordination with the network entity.

26. The apparatus of claim 23, wherein the at least one processor configured to transmit the uplink signaling is further configured to transmit one or more of special channel state information (CSI), a special physical random access channel (PRACH) transmission, a sounding reference signal (SRS) transmission, or a medium access control (MAC) control element (MAC-CE), wherein the special CSI comprises special CSI content not defined in normal CSI content, wherein the special PRACH transmission comprises a reserved preamble sequence reserved for DRX synchronization coordination, and wherein the special SRS transmission comprises a muted SRS transmission or one or more muted SRS port transmissions.

27. The apparatus of claim 23, wherein the at least one processor configured to transmit the uplink signaling is further configured to transmit, to the network entity, a medium access control (MAC) control element (MAC-CE) comprising a request to release the C-DRX configuration by RRC signaling based on one or more of a quality-of-service configuration of the UE, a battery status of the UE, or a buffer size of the UE.

28. The apparatus of claim 23, wherein the at least one processor is further configured to receive, from the network entity, a C-DRX command that causes the UE to transition into the off duration of the DRX cycle prior to expiration of the inactivity timer based on the transmitted uplink signaling.

29. The apparatus of claim 23, wherein:

the at least one processor configured to receive the DRX synchronization coordination configuration is further configured to receive, from the network entity, a radio resource control (RRC) reconfiguration message comprising the DRX synchronization coordination configuration, the RRC configuration message comprises a connected-mode DRX (C-DRX) configuration based at least in part on the UE capability message, and the at least one processor is further configured to receive, from the network entity, a radio resource control (RRC) reconfiguration message comprising a request to the UE to release the C-DRX configuration based on the transmitted uplink signaling.

30. An apparatus for wireless communication at a network entity, comprising:

a memory; and at least one processor coupled to the memory and configured to:

receive, from a user equipment (UE), a UE capability message that indicates that the UE has capability to support connected mode discontinuous reception (C-DRX) on/off synchronization coordination with the network entity;

transmit, to the UE, a DRX synchronization coordination configuration based on the UE capability message, the DRX synchronization coordination configuration configuring the UE with the C-DRX on/off synchronization coordination with the network entity;

receive, from the UE, uplink signaling indicating that the UE intends to transition into an off duration in a DRX cycle based on a first inactivity timer of the UE being within a threshold time to expire; and transmit, to the UE, a C-DRX command that causes the UE to transition into the off duration of the DRX cycle prior to expiration of the first inactivity timer.

* * * * *